United States Patent [19]

Takizawa

[11] 4,108,445
[45] Aug. 22, 1978

[54] PHONOGRAPH RECORD PLAYER

[75] Inventor: Kazuyuki Takizawa, Chiba, Japan

[73] Assignee: Sony Corporation, Tokyo, Japan

[21] Appl. No.: 739,358

[22] Filed: Nov. 5, 1976

[30] Foreign Application Priority Data

Nov. 10, 1975 [JP] Japan ............................... 50-135989

[51] Int. Cl.² .............................................. G11B 17/06
[52] U.S. Cl. ................................... 274/9 R; 274/15 R
[58] Field of Search .................... 274/9 R, 10 R, 15 R

[56] References Cited
U.S. PATENT DOCUMENTS

| 3,438,635 | 4/1969 | Hansen | 274/9 R |
| 3,854,730 | 12/1974 | Takizawa | 274/15 R |

Primary Examiner—Steven L. Stephan
Attorney, Agent, or Firm—Lewis H. Eslinger; Alvin Sinderbrand

[57] ABSTRACT

In a phonograph record player, an improved control mechanism is provided for effecting lead-in movement of a tone arm from an elevated rest position outside the perimeter of a turntable to a selected set-down position on a record supported by the turntable so as to commence a play operation, and for effecting a return movement of the tone arm to its rest position upon the termination of the play operation. In such control mechanism, a main lever is angularly displaced by a cam follower engaging in a cam groove of a control gear to effect the lead-in movement during turning of the control gear from a stop position to a play position, and to effect the return movement during the further turning of the control gear from its play position back to its stop position. In order to prevent inadvertent turning of the control gear from its stop or play position, the cam groove has depressions in its opposite side walls, respectively, disposed adjacent the cam follower in the stop and play positions, respectively, and an additional lever is biased by a spring to urge an edge thereof against a roller on the main lever which engages such edge at different locations, and thereby presses the main lever in opposed directions, when the control gear is in its stop and play positions, for holding the cam follower securely in the depression then adjacent thereto. The additional spring biased lever is rocked upon angular displacement of the main lever to cause a brake to frictionally resist, and thereby stabilize the lead-in and return movements of the tone arm.

9 Claims, 22 Drawing Figures

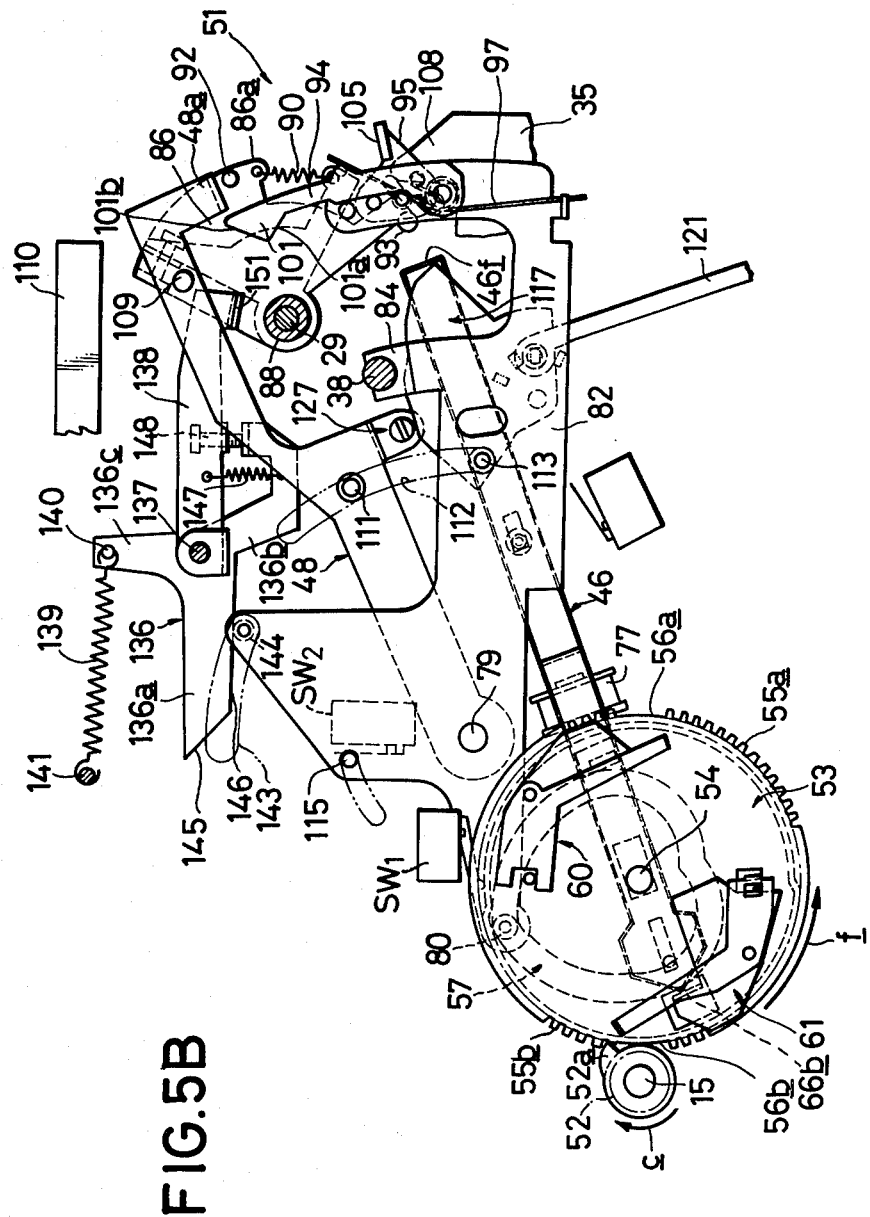

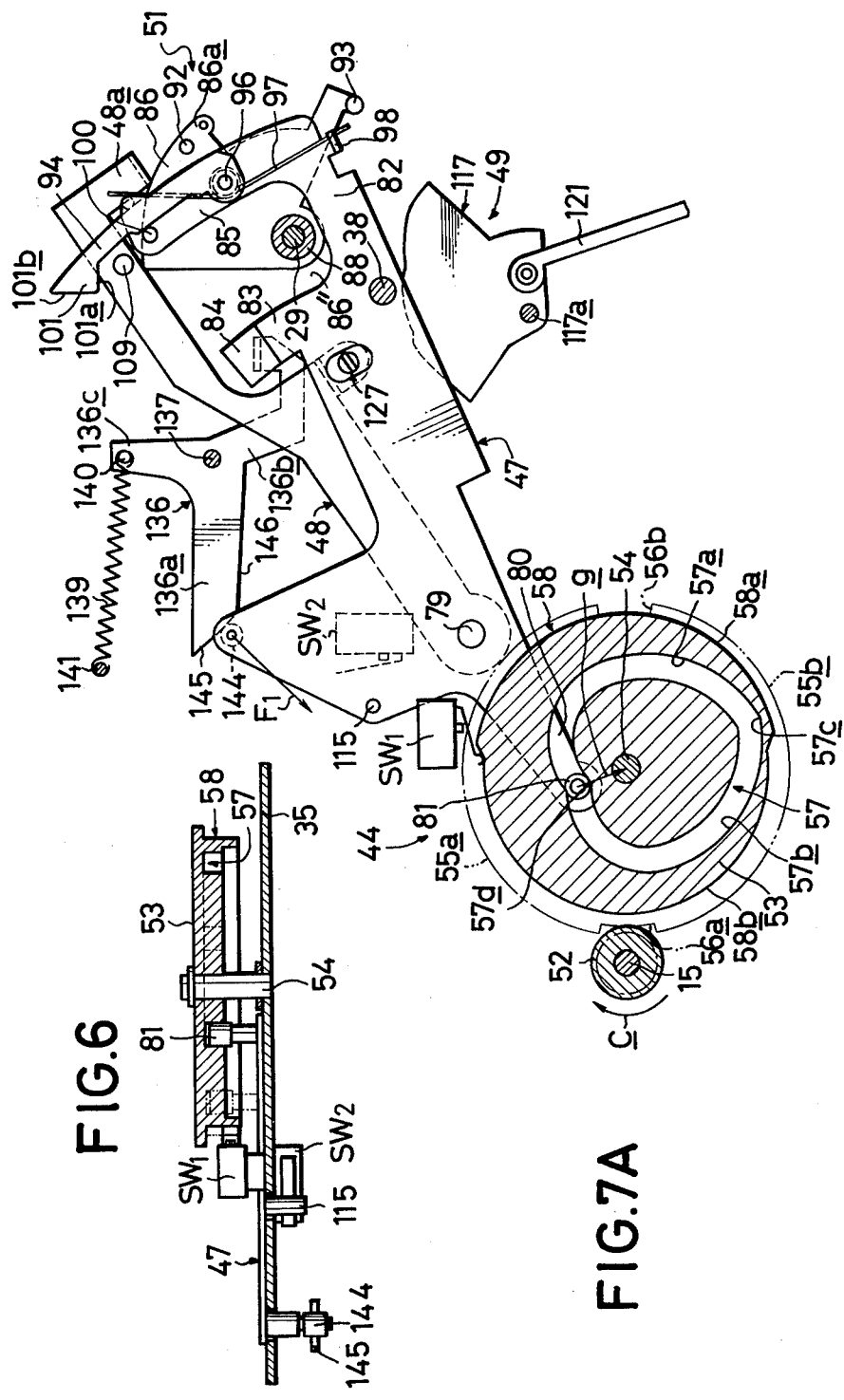

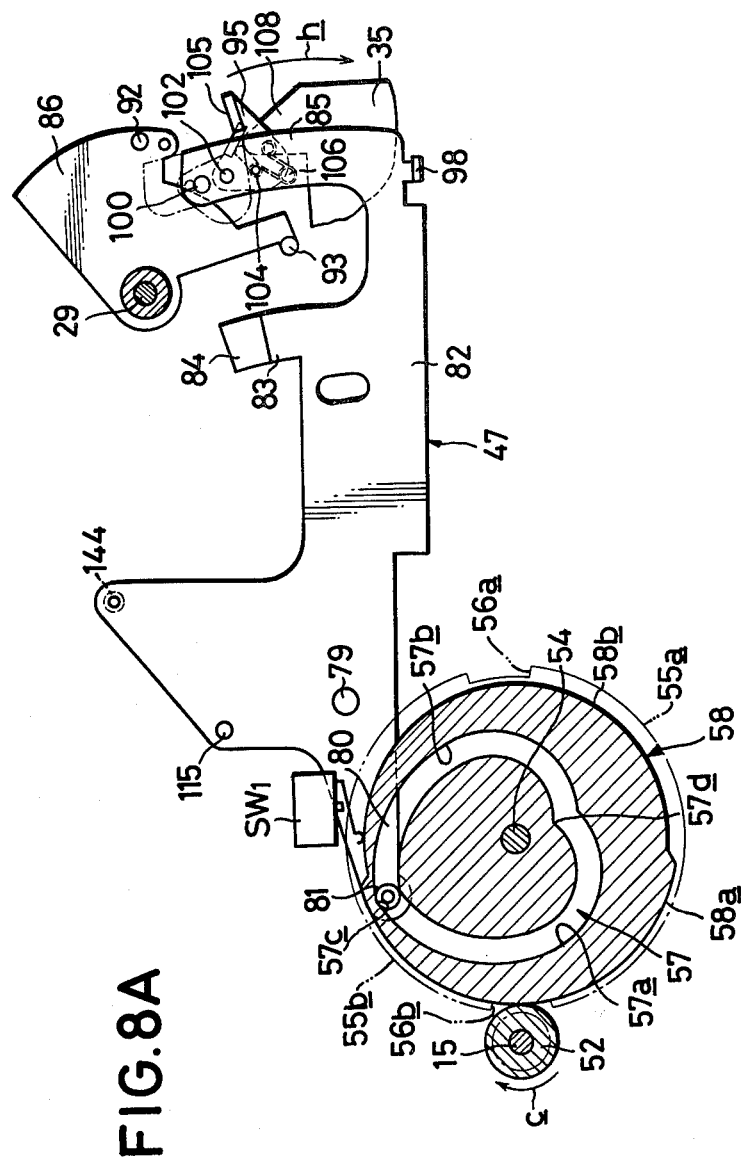

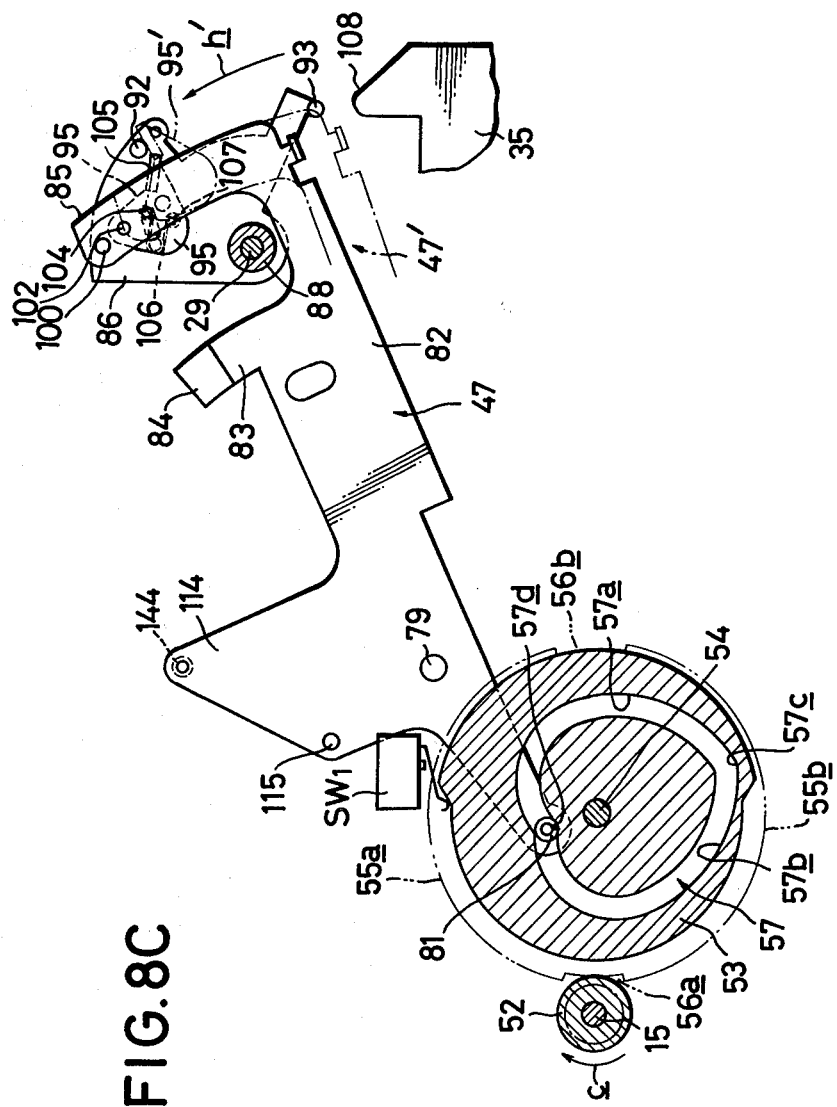

4,108,445

PHONOGRAPH RECORD PLAYER

BACKGROUND OF THE INVENTION

1. Field of the Invention

This invention relates generally to phonograph record players, and more particularly is directed to an improved phonograph record player control mechanism for effecting lead-in movement of a tone arm from an elevated rest position outside the perimeter of a turntable to a selected set-down position on a record supported by the turntable so as to commence a play operation, and for effecting a return movement of the tone arm to its rest position upon the termination of the play operation.

2. Description of the Prior Art

A so-called automatic phonograph record player is known in which the control mechanism thereof includes a drive gear rotatable with the turntable, a control gear having peripheral teeth engageable by the drive gear for turning the control gear to effect the lead-in and return movements of the tone arm by means of a lever assembly having a cam follower engaging a cam formed on the control gear, with the peripheral teeth of the control gear having two toothless gaps selectively facing the drive gear in stop and play positions, respectively, of the control gear, that is, when the tone arm is in its rest position and during a play operation, respectively. In order to avoid inadvertent turning of the control gear from its stop and play positions, the known control mechanism includes first and second recesses opening radially outward in a circumferential surface of the control gear and being located to receive first and second locking pins on respective spring biased levers when the control gear is in its stop position with one of its toothless gaps facing the drive gear, and when the control gear is in its play position with its other toothless gap facing the drive gear, respectively. The foregoing arrangement for holding the control gear against inadvertent turning from its stop and play positions is undesirable in that it is relatively complicated, and in that the two recesses for receiving the respective locking pins on the spring biased levers have to be exactly positioned in respect to the corresponding toothless gaps of the control gear and also in respect to the cam of the latter for effecting the lead-in and return movements of the tone arm. Thus, it is difficult with the described arrangement to accurately position the control gear for the rest position of the tone arm and for the play operation. Moreover, since the locking pins on the spring biased levers are continuously pressed against a circumferential surface of the control gear, the spring biased levers exert a braking effect on the control gear during the turning of the latter for effecting the lead-in and return movements.

In most of the existing fully automatic phonograph record players in which the lead-in and return movements of the tone arm are automatically effected, the tone arm is free to swing in the direction in which it is being propelled relative to the tone arm drive mechanism by which the swinging of the tone arm is effected during the lead-in and return operations. Therefore, by reason of the inertia of the tone arm, the latter is apt to move beyond the desired set-down position during the lead-in operation, and to rebound from the arm rest at the conclusion of the return operation. Although an existing phonograph record player applies a brake force directly to the tone arm before the latter reaches the arm rest during a return operation, such known record player does not apply a braking force to the tone arm during the lead-in operation as well as during the return operation, so that uncertainty or variations in the set-down position are still possible during the lead-in operation.

OBJECTS AND SUMMARY OF THE INVENTION

Accordingly, it is an object of this invention to provide a control mechanism for a phonograph record player which overcomes the above described problems and disadvantages associated with existing record players.

More specifically, it is an object of this invention to provide a record player control mechanism, as aforesaid, which includes a control gear for effecting the lead-in movement of the tone arm during turning of the control gear from a stop position to a play position, and for effecting the return movement of the tone arm during the further turning of the control gear from its play position back to its stop position, and in which a particularly simple and reliable arrangement is provided for preventing inadvertent turning of the control gear from its stop or play position.

Another object is to provide a record player control mechanism, as aforesaid, in which the arrangement provided for preventing inadvertent turning of the control gear from its stop or play position is further effective to precisely locate the control gear at each of such positions thereof.

Still another object is to provide a record player control mechanism, as aforesaid, in which the arrangement provided for preventing inadvertent turning of the control gear from its stop or play position imposes a minimal resistance to turning of the control gear when the latter is being rotated for effecting the lead-in and return movements of the tone arm.

Still another object of this invention is to provide a record player control mechanism, as aforesaid, in which the swinging movements of the tone arm are automatically braked during the lead-in operation and the return operation so as to ensure that, at the completion of the lead-in operation, the stylus depending from a pickup carried by the tone arm will reliably and accurately set-down on the record at the previously selected position, and further to ensure that the tone arm will be smoothly and reliably returned to its rest position at the completion of the return operation.

A still further object of this invention is to provide a record player control mechanism, as aforesaid, in which the means provided for applying the braking force to the tone arm during the lead-in and return operations has elements in common with the means provided for preventing inadvertent turning of the control gear from its stop and play positions, whereby to simplify the construction of the control mechanism.

In accordance with an aspect of this invention, the control gear of a record player control mechanism has a cam groove which includes a lead-in cam groove portion having connections, at its opposite ends, to adjacent ends of a return cam groove portion, and first and second depressions in opposite side walls, respectively, of the cam groove at the mentioned connections, respectively, of the lead-in and return cam groove portions, a pivotally mounted lever has a cam follower engaging the cam groove for effecting the lead-in and return movements of the tone arm by engagement of the cam follower with the lead-in and return cam groove portions during turning of the control gear from its stop position to its play position, and during further turning of the control gear from its play position to its stop position, respectively, and the means for holding the control gear against inadvertent turning from its stop and play positions acts on the lever to urge the cam follower in one direction into the first depression with the control gear in its stop position and in the opposite direction into the second depression with the control gear in its play position.

It is a feature of this invention to provide the control gear with a heart-shaped cam groove so as to define the lead-in and return cam groove portions at the opposite sides of its plane of symmetry and further to provide inverted cusps in the inner and outer side walls of the cam groove constituting the previously mentioned first and second depressions, respectively.

It is a further feature of this invention to provide the means for holding the control gear against inadvertent turning from its stop and play positions in the form of an additional pivoted lever, a spring urging the additional lever to turn in one direction, and cooperating means on the additional lever and on the first mentioned lever, that is, the lever carrying the cam follower, which cooperating means are engageable with each other for transmitting the force of the spring to the first lever at different locations when the control gear is in its stop and play positions, respectively, whereby to urge the first lever in opposite directions about the pivoting axis thereof.

In accordance with another aspect of this invention, turning of the first mentioned lever for effecting the lead-in and return movements of the tone arm causes rocking of the additional lever, and a braking means is made operative by such rocking of the additional lever for braking the lead-in and return swinging movements of the tone arm.

The above, and other objects, features and advantages of this invention, will be apparent in the following detailed description of illustrative embodiments of the invention which is to be read in connection with the accompanying drawings.

BRIEF DESCRIPTION OF THE DRAWINGS

FIGS. 5A and 5B are plan views showing the control mechanism of the record player in its stop or rest condition and in its play condition, respectively;

FIG. 6 is a detail sectional view taken along the line VI—VI on FIG. 5A;

FIGS. 7A-7E are plan views particularly showing a control gear, a main lever and a lead-in lever of the record player control mechanism in various positions of the control gear for illustrating the manner in which the main lever and lead-in lever are driven;

FIGS. 8A-8C are plan views illustrating the operation of a return drive member of a tone arm drive mechanism in several positions of the control gear;

DESCRIPTION OF A PREFERRED EMBODIMENT

Figure 1:
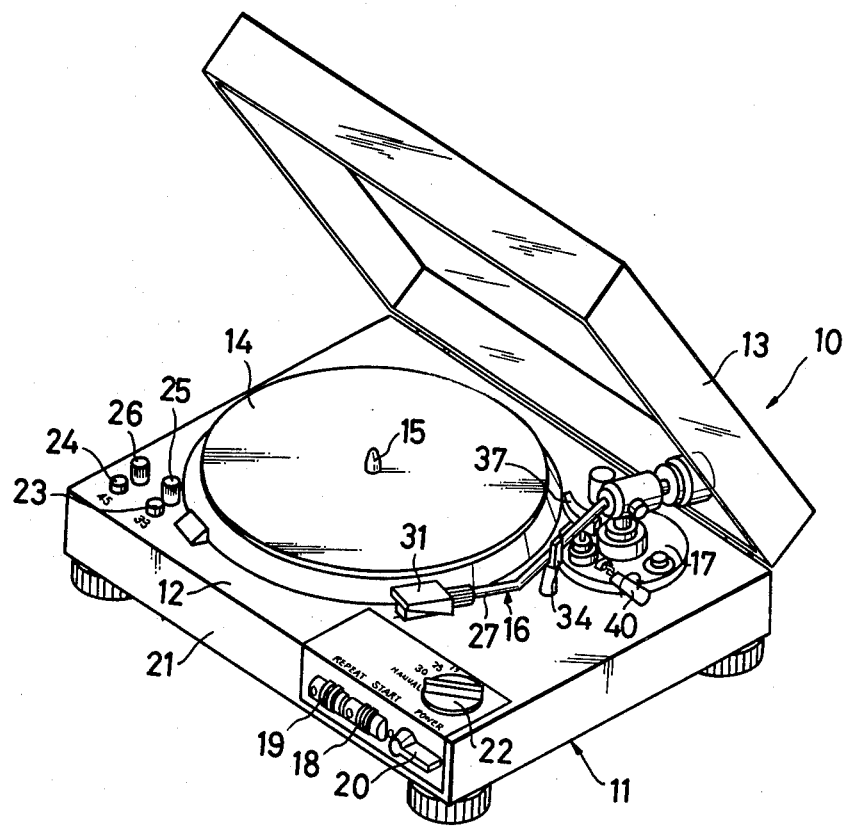
FIG. 1 is a perspective view of a phonograph record player according to this invention.

Referring to the drawings in detail, and initially to FIG. 1 thereof, it will be seen that a fully automatic record player 10 according to an embodiment of this invention is there illustrated to comprise a cabinet 11 having a deck or upper panel 12 and a pivoted dust cover 13 for enclosing a space above upper panel 12, a turntable 14 which is rotatably supported above upper panel 12 on a driving shaft or spindle 15, and a tone arm assembly 16 mounted, as hereinafter described, on a tone arm support bracket 17 which is secured to a rear portion of upper panel 12 adjacent the perimeter of turntable 14. A start-stop switch actuator 18, a repeat switch actuator 19 and a power ON-OFF switch actuator or knob 20 are mounted at a front panel 21 of cabinet 11 adjacent one side of the latter, and a record size selecting knob 22 is mounted on the front portion of upper panel 12 adjacent the same side of the cabinet as switch actuators 18-20. Switch controlling push-buttons 23 and 24 extend upwardly from the front portion of upper panel 12 adjacent the side of cabinet 11 remote from knob 22 and are selectively actuable for determining the speed of rotation of turntable 14, and knobs 25 and 26 are mounted adjacent push-buttons 23 and 24, respectively, and are selectively rotatable for effecting fine adjustment of the turntable speeds determined by selective actuation for the respective push-buttons.

Figure 3:
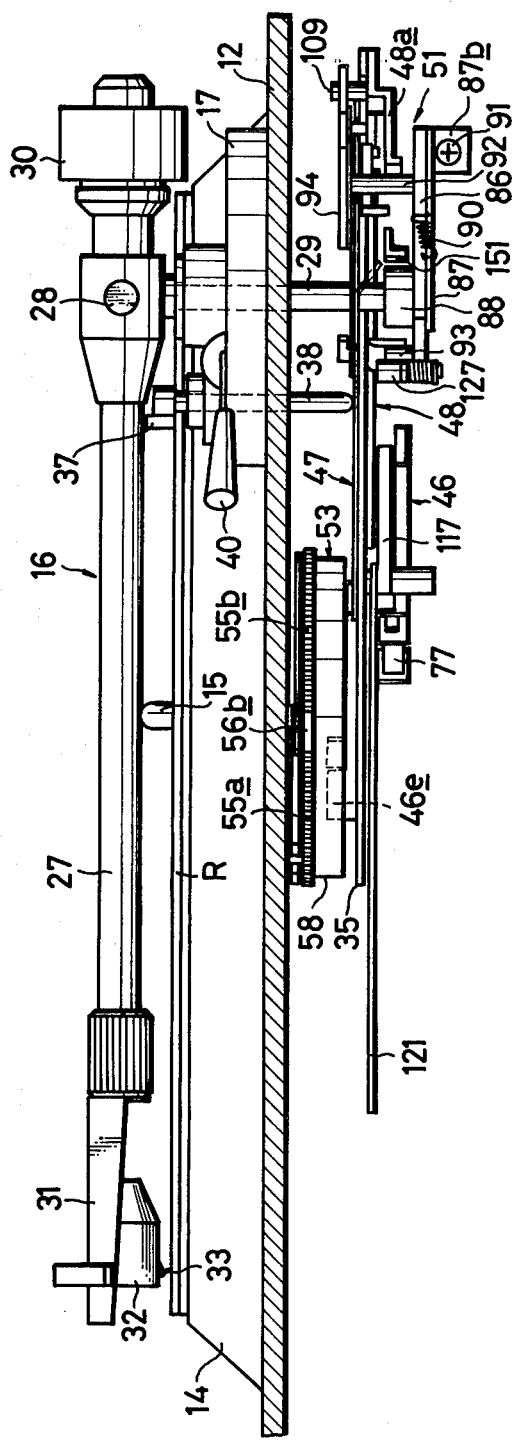
FIG. 3 is a side elevational view of a tone arm assembly and a control mechanism of the record player of FIGS. 1 and 2.

As shown particularly on FIG. 3, tone arm assembly 16 conventionally includes an elongated tone arm 27 mounted adjacent one end, as by a gimbal 28, on the upper end of a vertical shaft 29 which is rotatable in suitable bearings carried by support bracket 17, a counter-weight 30 extending from the mounted end of tone arm 27, and a head-shell 31 extending from the opposite or free end of tone arm 27 to accommodate a cartridge 32 from which a stylus or needle 33 depends. By reason of the above mounting of tone arm assembly 16, tone arm 27 is capable of lateral swinging movement about the vertical axis of shaft 29 across turntable 14 and also is capable of being raised and lowered about the horizontal axis of gimbal 28 relative to turntable 14 between an elevated rest position outside the perimeter of the turntable where tone arm 27 may be disposed on an arm rest 34, as shown on FIG. 1, and an inner position, for example, as indicated in broken lines at 16' on FIG. 13 and which corresponds to the engagement of the stylus 33 of pickup 32 in the conventional final non-recorded groove portion of a record R (FIG. 3) on turntable 14.

A chassis 35 (FIGS. 2 and 3) is suitably suspended under upper panel 12 of cabinet 11, and an electric motor (FIG. 2) is mounted below a portion of chassis 35 and directly drives the driving shaft 15 on which turntable 14 is mounted. An arcuate arm lifter 37 (FIGS. 1, 3 and 4) extends under tone arm 27 in all positions of the latter and is mounted on the upper end of a vertically movable shaft 38 which is slidable in a bearing 39 (FIG. 4) formed in a portion of support bracket 17 offset forwardly from shaft 29. It will be apparent that tone arm 27 is raised and lowered, for example, between the positions shown in full and broken lines on FIG. 4, in response to vertical movements of shaft 38 and of the arm lifter 37 therewith. As will be apparent hereinafter, the record player 10 is capable of either fully automatic operation or manual operation in dependence on the positioning of record size selecting knob 22. When manual operation is selected, the vertical movements of arm lifter 37, and hence the raising and lowering of tone arm 27, may be effected by a manually actuable cueing control handle 40 (FIG. 1) which is adapted to turn a shaft 41 journalled in support bracket 17 (FIG. 4) and carrying a cam 42 disposed under an abutment 43 on shaft 38. It will be apparent that, in response to turning of shaft 41 by handle 40, cam 42 acts against abutment 43 to determine the vertical position of arm lifter 37.

Figure 2:
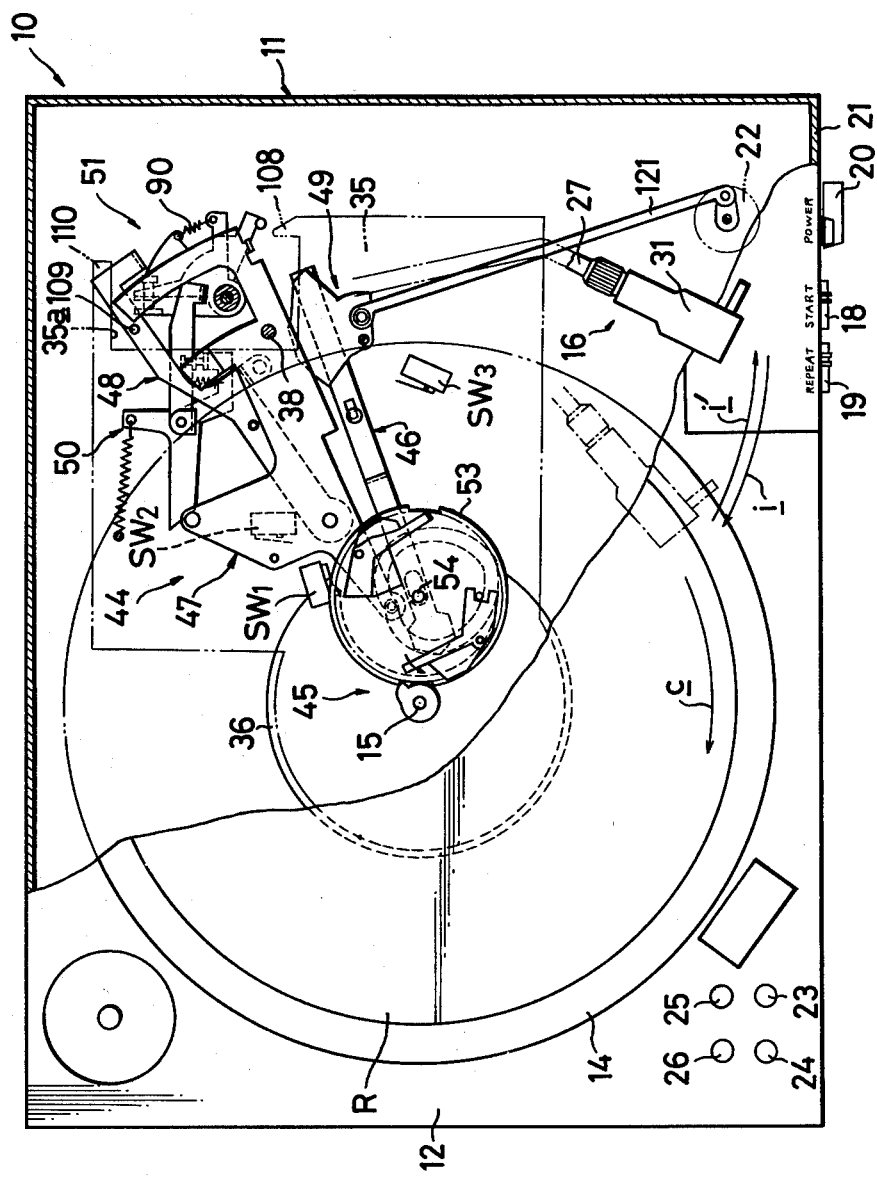
FIG. 2 is a top plan view of the record player of FIG. 1 with its turntable and an upper panel of its cabinet being partly broken away.

The illustrated record player 10 according to this invention further comprises an automatic control mechanism 44 which is shown on FIG. 2 to generally comprise a control gear assembly 45 operable from the driving shaft or spindle 15, an actuating slide 46 for initiating operations of control gear assembly 45, a main lever 47 movable in response to operation of control gear assembly 45, a lead-in lever 48 adapted to be coupled with main lever 47 for following the movement of the latter during swinging or lead-in of tone arm 27 to a predetermined start-of-play of set-down position of the stylus on a record R, a record size selecting mechanism 49 for determining such start-of-play or set-down position under the control of knob 22, and a brake mechanism 50 for frictionally braking the swinging movement of tone arm 27 during lead-in of the latter from its rest position to the predetermined set-down position and during the return swinging movement of the tone arm to its rest position. Furthermore, as shown on FIGS. 5A and 5B, automatic control mechanism 44 generally comprises a tone arm drive mechanism 51 through which the lead-in and return swinging movements of tone arm 27 are effected in response to corresponding movements of main lever 47 and lead-in lever 48.

Figure 14:
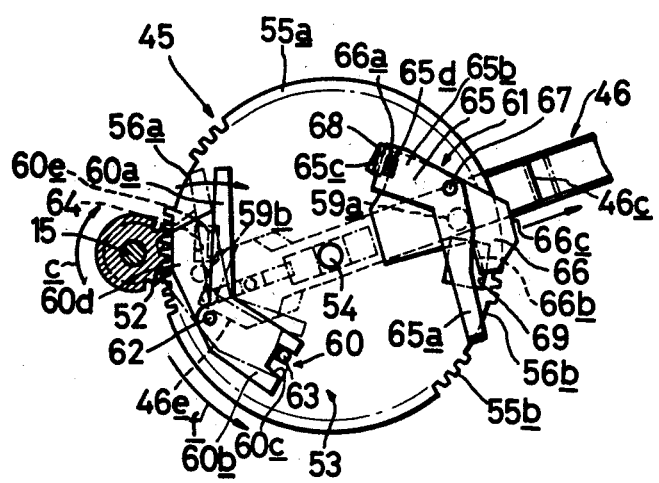
FIG. 14 is a view similar to a portion of FIGS. 12 and 13, but showing the condition of the clutches in the course of the return movement of the control gear.
Figure 15:
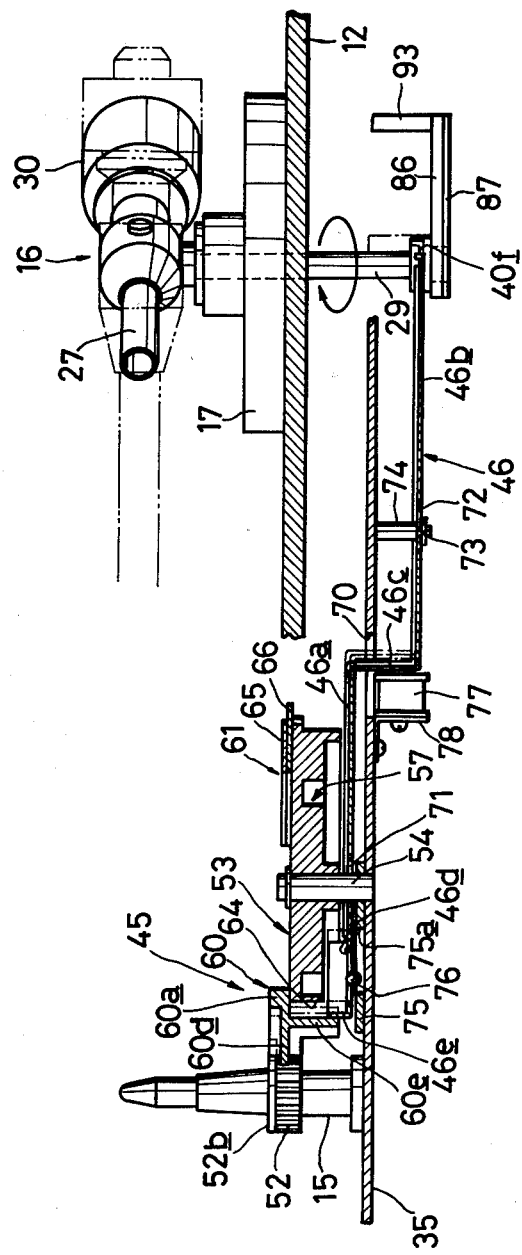
FIG. 15 is a sectional view taken along the line XV—XV on FIG. 12.

As shown particularly on FIGS. 14 and 15, the control gear assembly 45 includes a drive gear or pinion 52 secured on driving shaft 15 above chassis 35, and a driven or control gear 53 which is rotatably mounted on a shaft 54 which projects upwardly from chassis 35. The upper portion of the periphery of control gear 53 is formed with two sets of gear teeth 55a and 55b each extending along slightly less than one-half of the circumference of gear 53, with the sets of gear teeth 55a and 55b being separated from each other by diametrically opposed toothless gaps 56a and 56b. The shaft 54 supporting control gear 53 is positioned in respect to driving shaft 15 so as to provide meshing engagement of pinion 52 with the set of teeth 55a or 55b when the respective set of teeth faces toward shaft 15 so as to drive gear 53 from the latter; whereas, shaft 15 and pinion 52 can continue to rotate with control gear 53 remaining at rest when such gear 53 is disposed with either the toothless gap 56a and 56b facing toward shaft 15, as shown on FIGS. 5A and 5B, respectively. During the engagement of gear teeth 55a with pinion 52 and the corresponding one-half revolution or lead-in movement of control gear 53, control mechanism 44 effects the lead-in of tone arm assembly 16 from its rest position to the predetermined set-down position of the stylus on a record and, during the engagement of gear teeth 55b with pinion 52 and the corresponding one-half revolution or return movement of gear 53, control mechanism 44 effects the return of tone arm assembly 16 to its rest position, as hereinafter described in detail.

In order to effect the lead-in and return swinging movements of tone arm assembly 16 in response to turning of control gear 53, a cam groove 57 is formed in control gear 53 and opens downwardly at the lower surface of the latter (FIG. 15). As shown particularly on FIGS. 7A–7E and 8A–8C, cam groove 57 is heart-shaped so as to include cam groove portions 57a and 57b which are symmetrical to each other and respectively operative to effect the lead-in and return swinging movements of tone arm assembly 16. By reason of the heart-shaped configuration of cam groove 57, an inverted cusp or depression 57c is defined in the outer wall surface of cam groove 57 at the connection of cam groove portion 57a to cam groove portion 57b, and a similar inverted cusp or depression 57d is formed in the inner wall surface of cam groove 57 at the connection of cam groove portion 57b to cam groove portion 57a. The periphery of the lower portion of the control gear 53 defines a radial cam 58 (FIGS. 7A–7E) for controlling a micro-switch $SW_1$ mounted on chassis 35 (FIG. 6), and such radial cam is comprised of a radially raised cam portion 58a actuating switch $SW_1$ during the lead-in movement of control gear 53, and a radially depressed cam portion 58b extending over the remainder of the periphery of control gear 53 so as to determine the state of switch $SW_1$ in the stop and play positions of gear 53, that is, when the toothless gap 56a or 56b faces toward pinion 52 (FIGS. 7A and 7C) and during the return movement of gear 53 at the conclusion of a record playing operation (FIGS. 7D and 7E). Thus, switch $SW_1$, when actuated by cam portion 58a, detects the lead-in operation of record player 10. Finally, as shown in broken lines on FIG. 5A, a pair of pins 59a and 59b depend from the lower surface of control gear 53 at diametrically opposed locations that are slightly in advance of the locations of toothless gaps 56b and 56a, respectively, considered in the counterclockwise direction of rotation of control gear 53, as viewed from above.

In order to initiate the lead-in movement of control gear 53 from its stop position (FIG. 5A) in which toothless gap 56a faces pinion 52, and the return movement of gear 53 from its play position (FIG. 5B) in which toothless gap 56b faces pinion 52, control gear assembly 45 is further shown to comprise lead-in and return clutch mechanisms 60 and 61, respectively, which are substantially diametrically opposed on the flat upper surface of control gear 53. As shown particularly on FIGS. 12, 13 and 14, lead-in clutch mechanism 60 may be in the form of a one-piece molded plastic lever pivoted, intermediate its ends, on a pin 62 projecting upwardly from control gear 53 and having oppositely directed arms 60a and 60b which are at an angle to each other. The end of lever arm 60b has a cutout 60c therein which loosely receives a pin 63 projecting upwardly from control gear 53 for limiting the angular movement of lead-in clutch mechanism 60 to the engaged and disengaged positions shown in full and broken lines respectively on FIG. 12. Clutch mechanism 60 further has a cam portion 60d extending outwardly from arm 60a so as to project radially beyond the teeth 55b of control gear 53 when clutch mechanism 60 is in its engaged position. As shown, lead-in clutch mechanism 60 is dimensioned and its pivot pin 62 is located so that, in the engaged position of such clutch mechanism indicated in full lines on FIG. 12, the free end of lever arm 60a projects above toothless gap 56a of control gear 53. Finally, a projection 60e depends from lever arm 60a and extends downwardly through a hole 64 formed in control gear 53 (FIG. 15) so as to be actuable by slide 46, as hereinafter described in detail.

Figure 12:
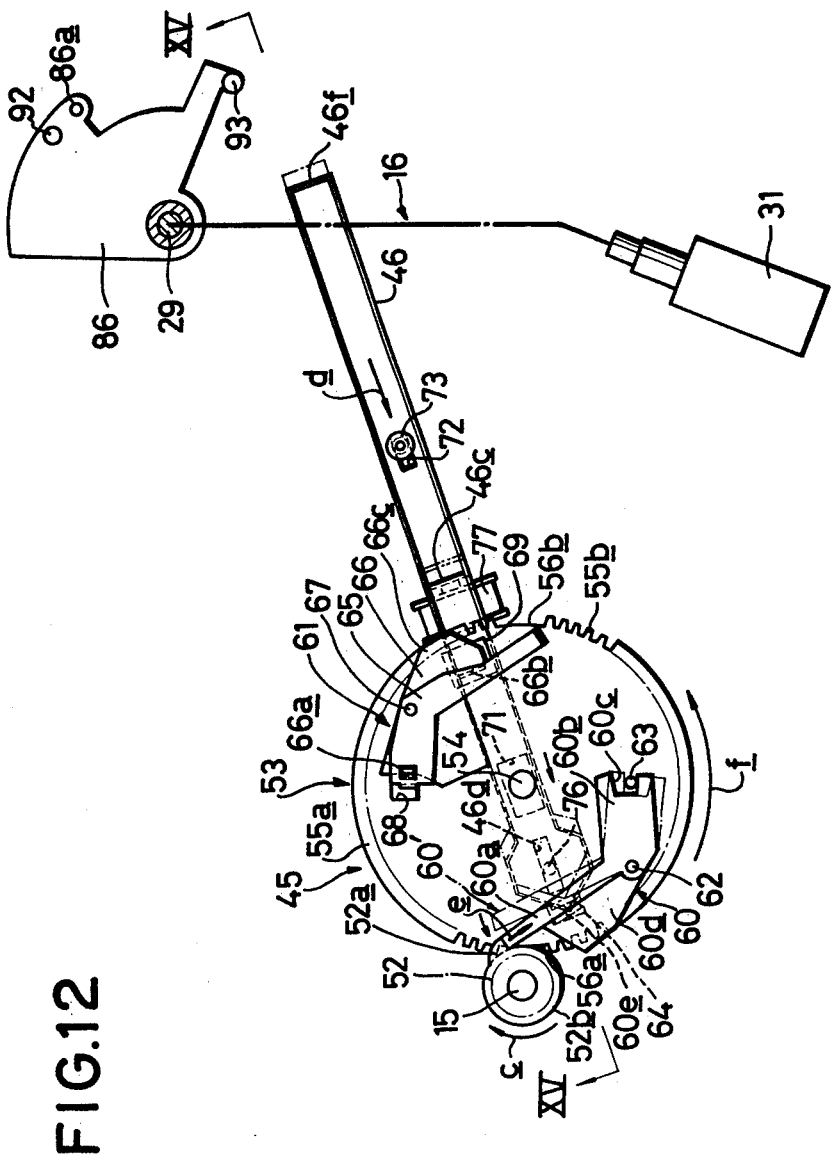
FIGS. 12 and 13 are plan views showing lead-in and return clutch mechanisms associated with the control gear and an actuator for such clutch mechanisms, with the control gear being illustrated in its stop position and in its play position, respectively.
Figure 13:
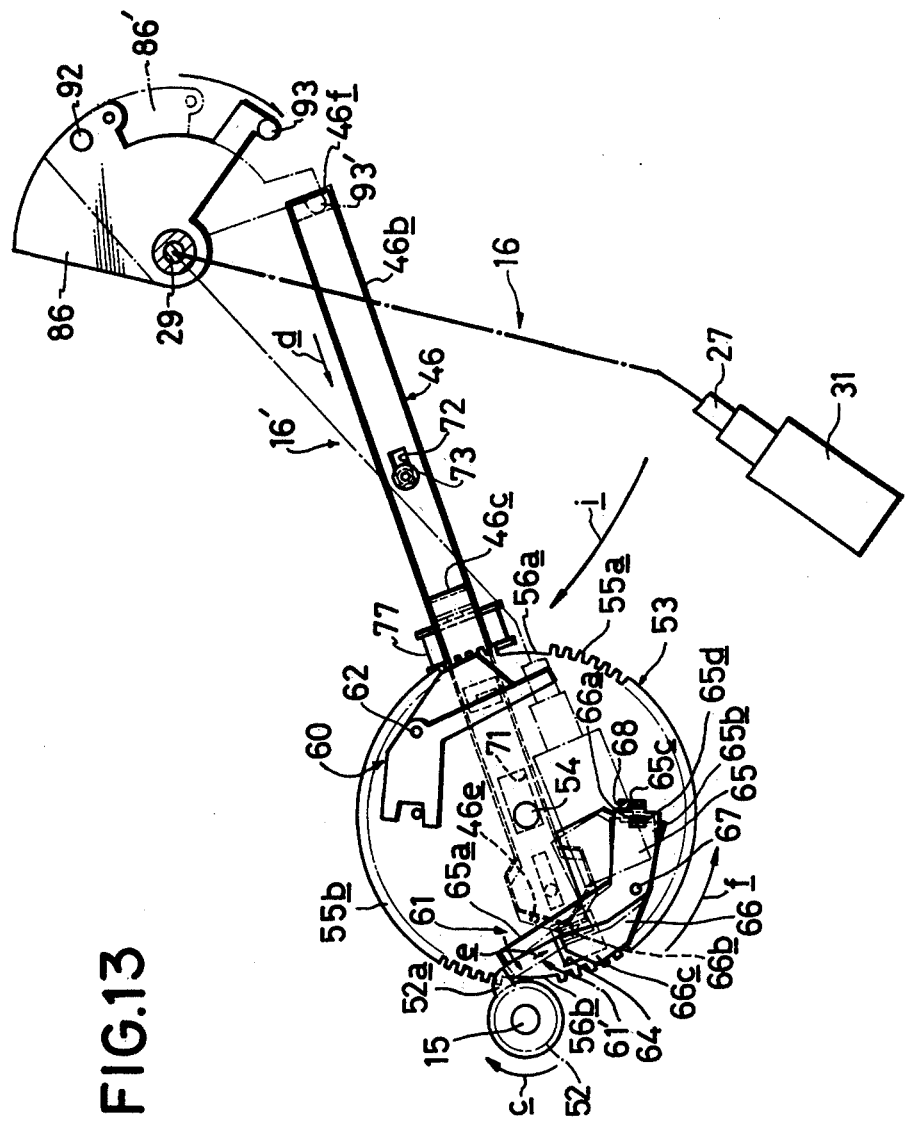

The return clutch mechanism 61 is shown to include an upper engaging member 65 superposed on a lower cam member 66, with both members 65 and 66 being pivotally mounted, intermediate their ends, on a pivot pin 67 projecting from the upper surface of control gear 53 so that engaging member 65 and cam member 66 are angularly displaceable relative to each other and relative to gear 53. As shown, the upper engaging member 65 is substantially in the form of a lever having oppositely directed arms 65a and 65b which are at an angle to each other, with engaging member 65 being dimensioned and the pivot pin 67 being located so that, in an engaged position of clutch mechanism 61, as indicated in broken lines at 61' on FIG. 13, the free end of arm 65a projects above toothless gap 56b of control gear 53. The angular displacement or swinging movement of engaging member 65 relative to control gear 53 between its engaged position shown in broken lines on FIG. 13 and on FIG. 14 and its disengaged position shown in full lines on FIGS. 12 and 13 is limited by a tab 65c directed downwardly from the free end of lever arm 65b and engaging loosely in a hole 68 formed in control gear 53. The angular displacement of engaging member 65 and cam member 66 relative to each other is limited by engagement, in a hole 65d formed in lever arm 65b, of an upwardly struck tab or projection 66a extending from the underlying cam member 66. The portion of the cam member 66 which extends from pivot pin 67 in the same general direction as lever arm 65a is formed with a downwardly directed projection 66b which passes through a hole 69 in control gear 53 so as to be actuable by slide 46, as hereinafter described in detail. When member 66 is thus actuated, a cam portion 66c thereof is made to project radially beyond teeth 55a on gear 53, as shown on FIG. 14, and engaging member 65 is moved to its engaged position through the lost-motion connection provided between members 65 and 66 by the engagement of projection 66a in hole 65d.

Control gear assembly 45 is completed by an abutment or nose 52a extending radially outward from a rim 52b provided integrally with pinion 52 at the top of the latter. Thus, when lead-in clutch mechanism 60 is displaced to its engaged position with gear 53 in its stop position (FIG. 12), abutment 52a in rotating with pinion 52 acts on the end of lever arm 60a to propel the latter longitudinally and thereby initiate turning of gear 53 until gear teeth 55a mesh with pinion 52 for effecting the lead-in movement of gear 53. Similarly, when return clutch mechanism 61 is displaced to its engaged position with gear 53 in its play position (FIG. 13), abutment 52a acts on the end of lever arm 65a to propel the latter longitudinally and thereby initiate turning of gear 53 until gear teeth 55b mesh with pinion 52 for effecting the return movement of gear 53.

As shown particularly on FIG. 15, actuating slide 46 is constituted by an elongated member formed with a step at its middle portion so as to have upper and lower horizontal portions 46a and 46b respectively disposed above and below chassis 35 and being connected by a vertical portion 46c which extends through an opening 70 in the chassis. Upper horizontal portion 46a extends between chassis 35 and the underside of control gear 53 and is formed with an elongated hole 71 through which shaft 54 extends. An elongated hole 72 (FIGS. 12, 13 and 15) is formed in lower horizontal portion 46b and receives a guide roller 73 carried by a post 74 depending from chassis 35. Further, a ball receiver 75 is fixed on chassis 35 under control gear 53 and is formed with a slit 75a along which a steel ball 76 free to roll, and the free end portion of upper horizontal portion 46a is formed with a slit 46d aligned with slit 75a and also receiving ball 76, from which it follows that actuating slide 46 is guided for free longitudinal sliding movement in respect to chassis 35 between operative and inoperative positions respectively shown in full lines on FIGS. 12 and 13. Further, the free end of upper horizontal portion 46a of slide 46 is formed with an upwardly directed, V-shaped projection 46e which is selectively engageable with the projection 60e of clutch mechanism 60 when control gear 53 is in its start position (FIG. 5A), or with the projection 66b of clutch mechanism 61 when control gear 53 is in its play position (FIG. 5B) for actuating the respective clutch mechanism 60 or 61 to its engaged position in response to longitudinal movement of actuating slide 46 from its inoperative position to its operative position. It is also to be noted that the previously described pins 59a and 59b depending from control gear 53 are radially positioned with respect to the axis of the latter so that, near the conclusion of the lead-in movement or the return movement of control gear 53 resulting from the meshing of its gear teeth 55a or 55b, respectively, with pinion 52, the pin 59a or 59b, respectively, will act against a sloping flank of the V-shaped projection 46e on actuating slide 46 for returning the latter from its operative position shown on FIG. 12 to its inoperative position shown on FIGS. 5A,5B and 13.

As shown particularly on FIG. 15, an electromagnet 77 is supported by a bracket 78 at the underside of chassis 35 adjacent opening 70 so that, upon energizing of electro-magnet 77, the latter will attract the vertical portion 46c of actuating slide 46 and thereby move the latter toward the left, as viewed on the drawing, for displacement of slide 46 from its inoperative position to its operative position.

Figure 4:
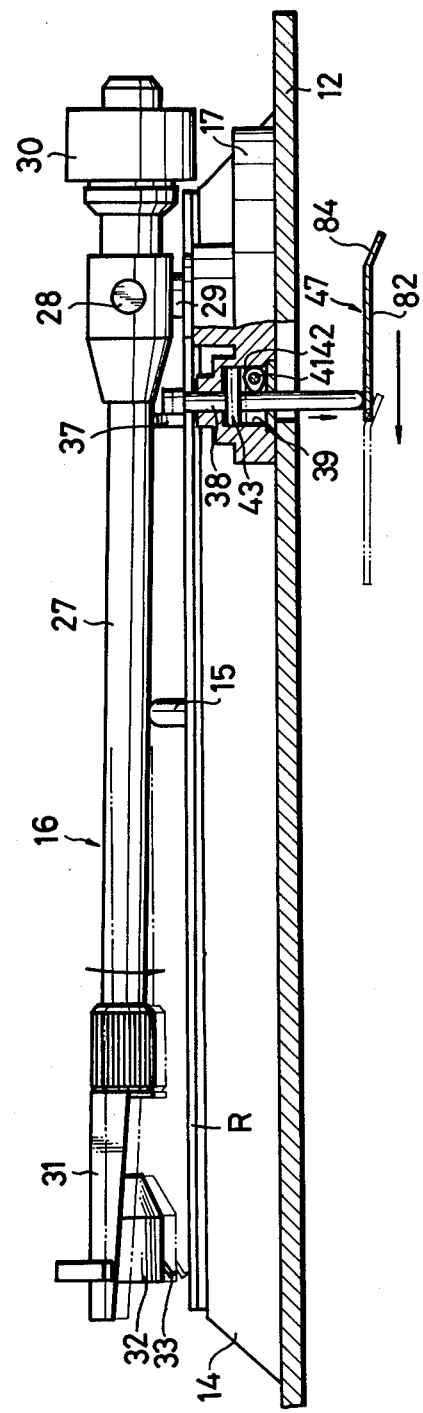
FIG. 4 is a side elevational view of the tone arm assembly and of an arm lifter and cueing control for the tone arm which are shown in section.
Figure 7B:
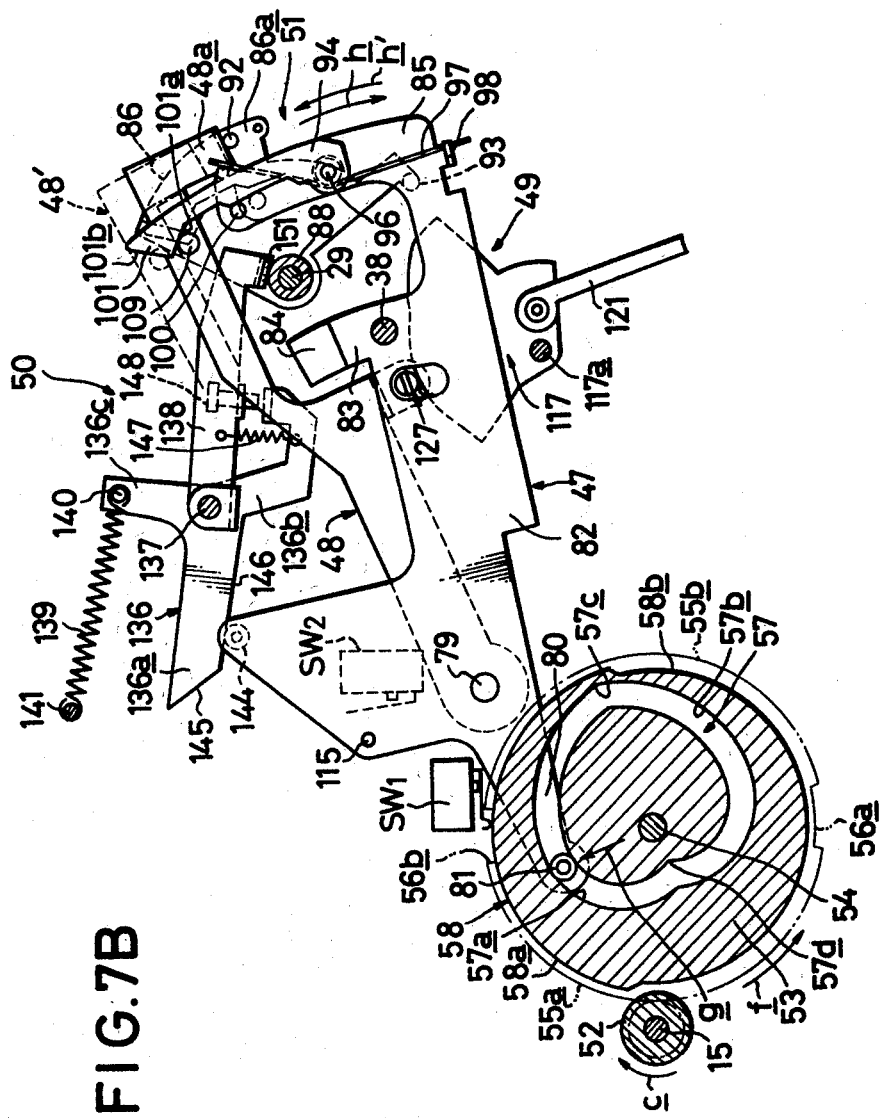
Figure 7C:
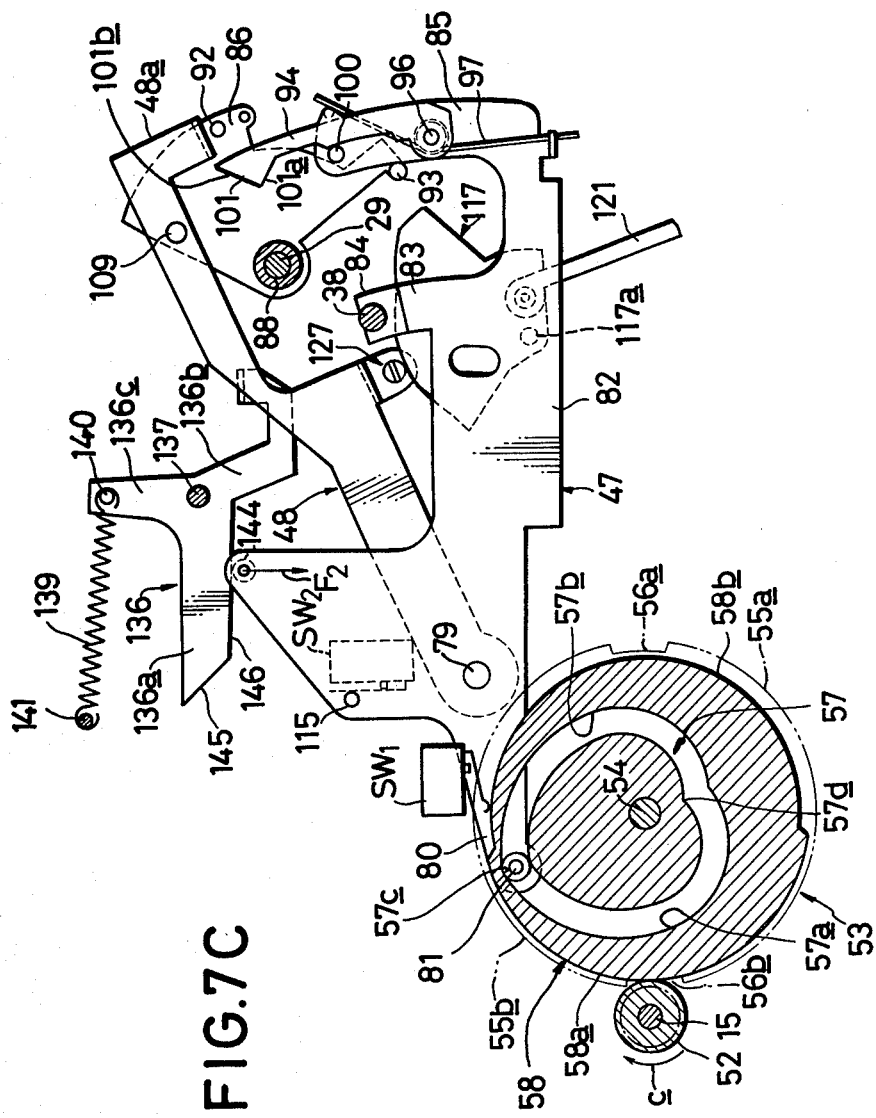
Figure 7D:
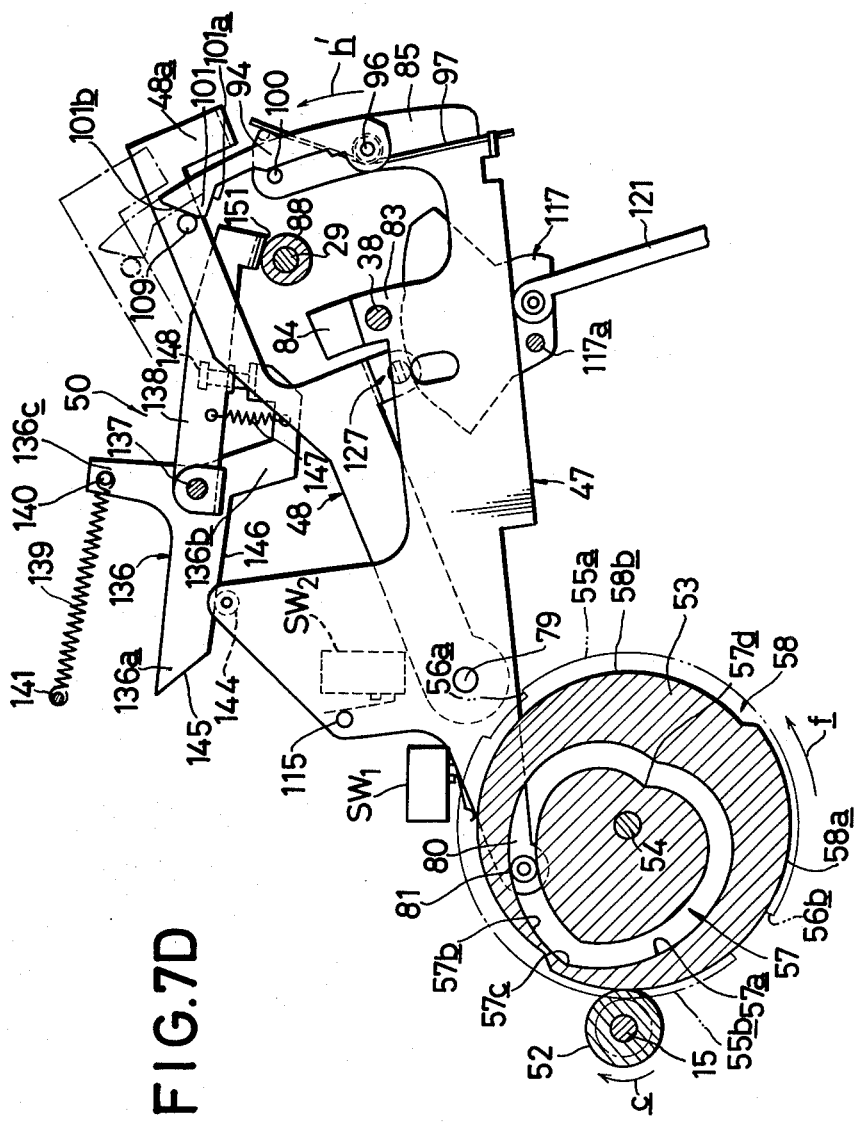
Figure 7E:
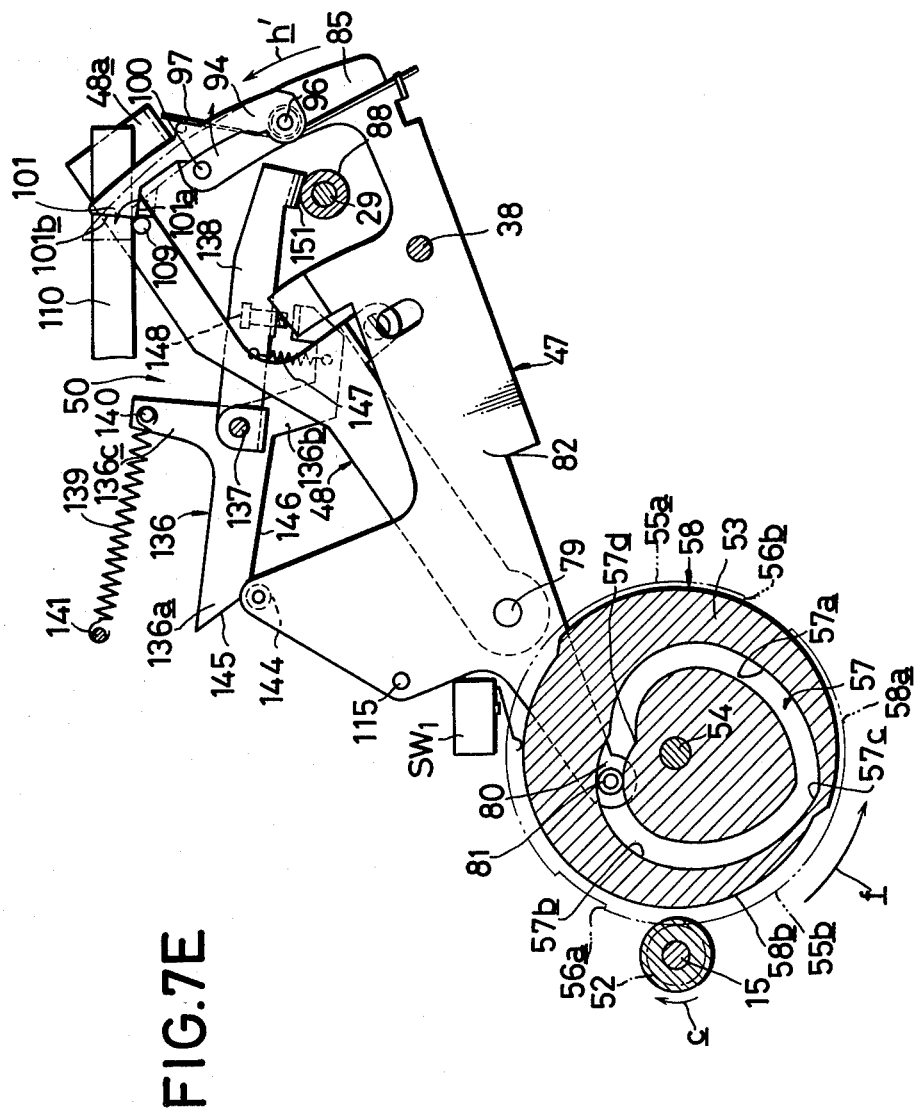

As shown most clearly on FIGS. 7A–7E and 8A–8E, the main lever 47, which is disposed above chassis 35, is pivoted, intermediate its ends, on the upper portion of a pivot pin 79 supported by chassis 35 at a location between shaft 54 of control gear 53 and support shaft 29 of tone arm assembly 16. Main lever 47 includes an arm 80 extending in the direction from pivot pin 79 under control gear 53, and such arm 80, at its free end, carries a cam follower roller 81 which engages in cam groove 57 for angularly displacing main lever 47 between a stop position (FIG. 7A) and a play position (FIG. 7C) in response to turning of control gear 53. Main lever 47 is further shown to include an arm 82 extending from pivot pin 79 substantially in the direction opposed to arm 80 and reaching under shaft 38 of arm lifter 37 so as to support shaft 38 at the lower end of the latter (FIG. 4). At the portion of lever arm 82 where the latter is engaged by shaft 38, an extension 83 is directed rearwardly from lever arm 82 and terminates in a downwardly inclined ramp 84 which moves under shaft 38 in the play position of main lever 47 (FIG. 7C). Thus, arm 82 of main lever 47 supports shaft 38 and arm lifter 37 in an elevated position corresponding to the raised position of tone arm 16 shown in full lines on FIG. 4 when main lever 47 is in its stop position (FIG. 7A) and during lead-in and return movements of main lever 47 (FIG. 7B). However, at the conclusion of lead-in movement of main lever 47, that is, when lever 47 attains its play position (FIG. 7C), downwardly inclined ramp 84 moves under shaft 38 to permit downward movement of the latter and of arm lifter 37 therewith so that tone arm 27 is lowered to the position indicated in broken lines on FIG. 4 for engaging the stylus 33 with a record R on turntable 14. The outer or free end portion of lever arm 82 is substantially L-shaped to provide a rearwardly directed extension 85 which, with previously mentioned extension 83, defines a cutout 86″ therebetween through which tone arm support shaft 29 can extend (FIG. 7A).

Figure 9:
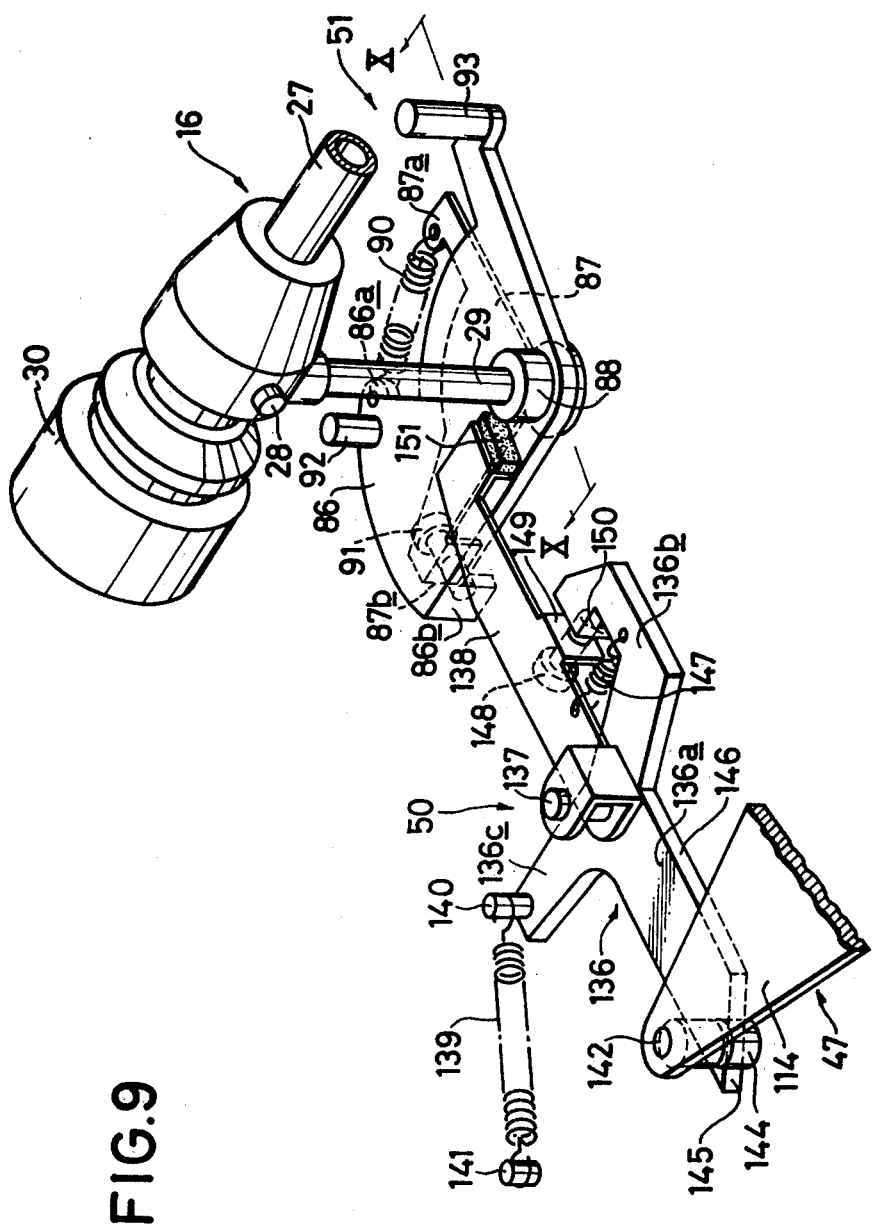
FIG. 9 is a perspective view illustrating the braking mechanism and the relation of the latter to the tone arm assembly.
Figure 10:
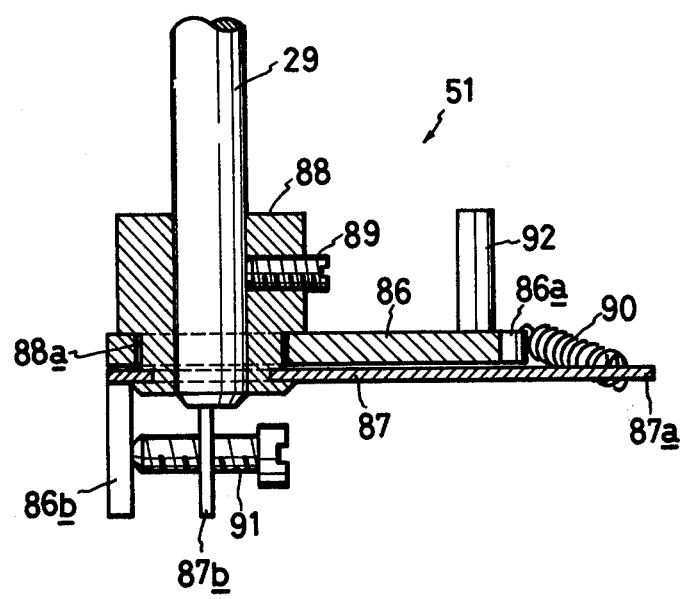
FIG. 10 is an enlarged detail sectional view taken along the line X—X on FIG. 9.

As shown particularly on FIGS. 9 and 10, tone arm drive mechanism 51 includes upper and lower generally sector-shaped members 86 and 87, respectively, mounted on the lower end portion of tone arm support shaft 29 so as to be turnable about the axis of the latter. A boss 88 is secured to shaft 29, as by a set screw 89 (FIG. 10), and the lower sector-shaped member 87 is suitably fixed to the lower end of boss 88 so as to be rotatably coupled with shaft 29. Boss 88 is further shown to have a reduced diameter portion 88a above member 87 which is turnably received in a hole in sector-shaped member 86 so that the latter is angularly displaceable about the axis of shaft 29 relative to the latter and to the lower sector-shaped member 87. A tension spring 90 is connected between a radially extending arm 87a on member 87 and an anchor 86a on member 86 for urging the latter to turn in the clockwise direction, as viewed on FIGS. 5A,5B and 9, relative to member 87. An adjustable limit screw 91 (FIG. 10) extends through a tapped hole in a tab 87b depending from an edge of sector-shaped member 87 and is engageable against a tab 86b depending from sector-shaped member 86 for adjustably limiting the angular displacement of member 86 relative to member 87 under the urging of spring 90. Pins 92 and 93 are directed upwardly from sector-shaped member 86 at spaced apart locations adjacent the periphery of the latter. As hereinafter described in detail, pin 92 is adapted to be acted upon for causing the lead-in and return swinging movements of tone arm assembly 16. On the other hand, pin 93 is positioned so that it may act against the free end 46f of lower horizontal portion 46b of actuating slide 46 for mechanically effecting the movement of the latter from its inoperative positions to its operative position when tone arm assembly 16 is angularly displaced, at the conclusion of a record playing operation, to the position indicated in broken lines at 16′ on FIG. 19 and which corresponds to the engagement of the stylus in the final non-recorded turns of the record groove.

Figure 5A:
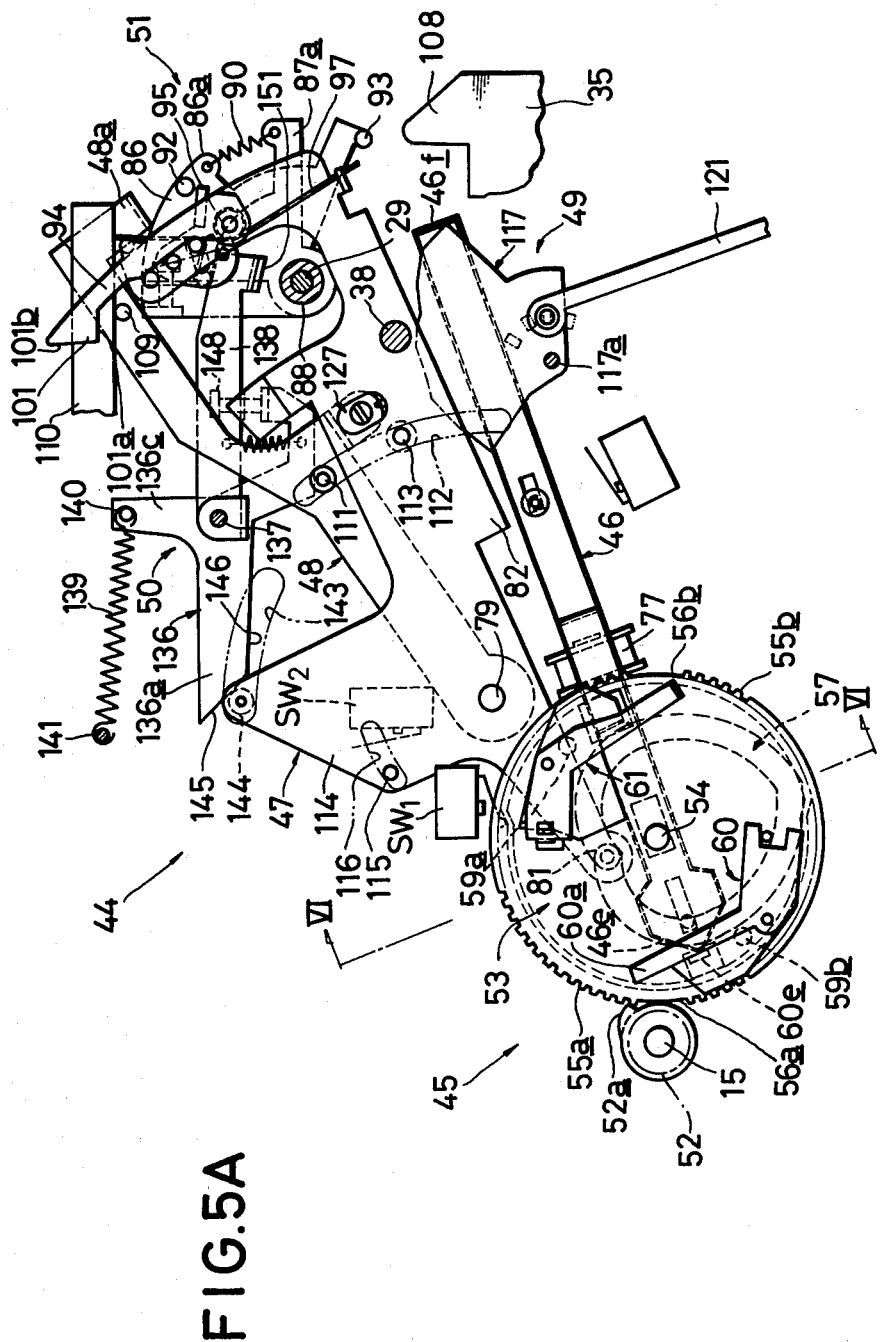
Figure 11:
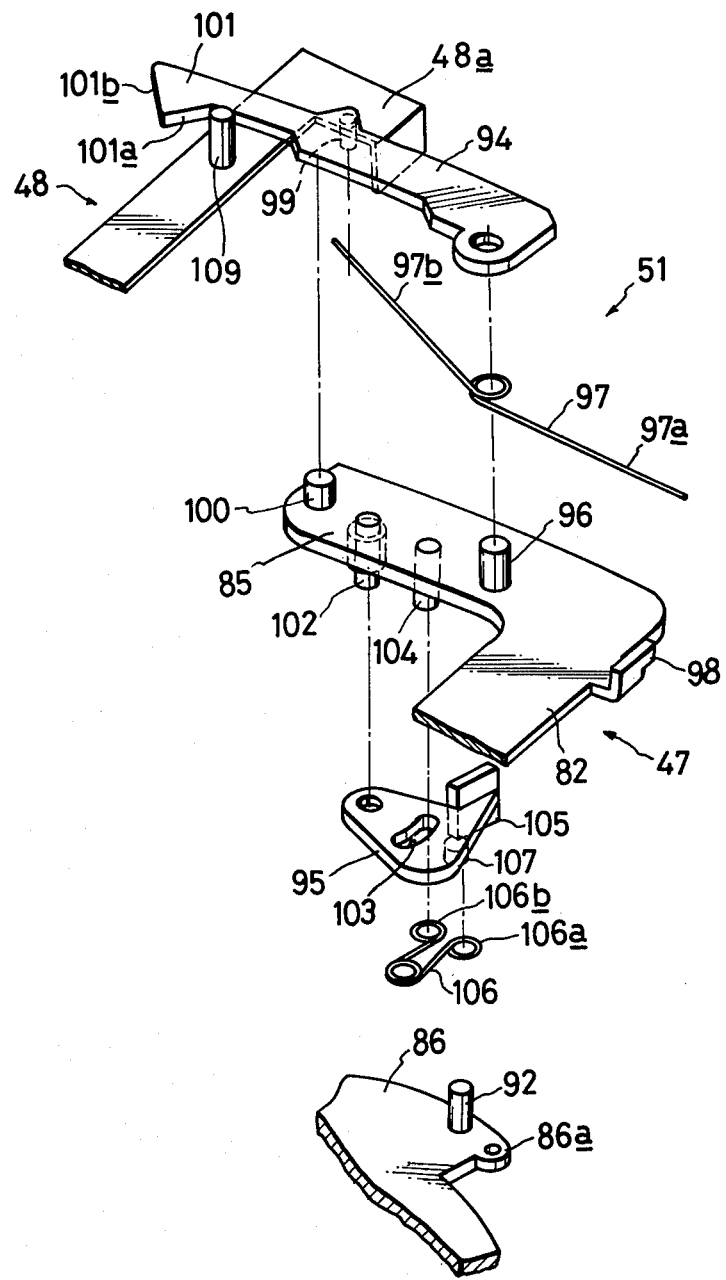
FIG. 11 is an exploded perspective view showing elements of the tone arm drive mechanism.

In order to ensure that manual interference with the lead-in or return swinging movements of tone arm 16 will not cuase damage to automatic control mechanism 44, the tone arm drive mechanism 51 is further shown to comprise a hooked lead-in drive member 94 and a return drive member 95 (FIGS. 5A,5B and 11). As shown particularly on FIG. 11, lead-in drive member 94 is pivotally mounted on, and extends rearwardly from a pivot pin 96 directed upwardly from extension 85 of main lever 47. A torsion spring 97 extends around pivot pin 96 and has legs 97a and 97b which respectively engage a keeper 98 on main lever 47 and a pin 99 depending from drive member 94 so that spring 97 urges drive member 94 in the counter-clockwise direction relative to lever extension 85, as viewed on FIGS. 5A and 5B, whereby to normally engage drive member 94 with a stop pin 100 on lever extension 85. The free or rear end portion of drive member 94 has a nose or barb 101 extending from the side thereof facing in the direction in which drive member 94 is urged by spring 97, and such nose 101 is shown to have angled flanks 101a and 101b.

The return drive member 95 is shown to include a generally sector-shaped plate which, at its apex, is pivoted on a pin 102 depending from lever extension 85, and which has an arcuate slot 103 concentric with the pivoting axis of drive member 95 and slidably receiving a pin 104 depending from lever extension 85 for limiting the pivotal movement of drive member 95 in respect to lever extension 85. An abutment 105 is directed laterally outward from the sector-shaped plate of drive member 95 for engagement with pin 92 on member 86 in effecting the return swinging movement of tone arm assembly 16, as hereinafter described in detail. Further, a toggle spring 106 is provided with eyes 106a and 106b at its opposite ends which respectively engage a pin 107 depending from drive member 95 and the lower end of the pin 104 received in arcuate slot 103. The pin 107 is disposed so as to be substantially on a line with pin 104 and pin 102 defining the pivoting axis of drive member 95 when pin 104 is substantially at the center of arcuate slot 103, and toggle spring 106 urges pins 104 and 107 away from each other. Therefore, toggle spring 106 may urge drive member 95 to an extended position, as shown on FIG. 5B and in full lines on FIGS. 8A and 8B, in which pin 104 engages one end of slot 103 and abutment 105 extends substantially outward from lever extension 85 so as to be engageable with pin 92, as hereinafter described. Alternatively, toggle spring 106 may urge drive member 95 to a retracted position, as shown on FIG. 5A and in full lines on FIG. 8C, in which pin 104 engages the other end of slot 103 and abutment 105 is near to the outer edge of lever extension 85 so as to be movable past pin 92 without engaging the latter. As shown on FIGS. 5A and 5B, chassis 35 is provided with a projection 108 engageable with the abutment 105 of drive member 95 for displacing the latter at least halfway from its retracted position to its extended position, and thereby permitting toggle spring 106 to complete the movement of drive member 95 to its extended position in response to movement of drive member 95, in its retracted position, with main lever 47 to the conclusion of the lead-in movement of such main lever.

The lead-in lever 48 which is disposed below chassis 35 is shown to be pivotally mounted, at one end, on the same pivot pin 79 as main lever 47 (FIGS. 5A,5B and 7A-7E). Lead-in lever 48 is shown to extend in back of tone arm support shaft 29, and the free end portion of lever 48 is provided with a forwardly directed extension 48a which is engageable with pin 92 on member 86 for effecting the lead-in swinging movement of tone arm assembly 16 as hereinafter described in detail. A coupling pin 109 is directed upwardly from the free end portion of lead-in lever 48 through a cutout 35a (FIG. 2) in chassis 35, and such coupling pin 109 is engageable by nose 101 of lead-in drive member 94 (FIG. 7B) for causing lead-in lever 48 to follow the lead-in movement of main lever 47 to the extent that record size selecting mechanism 49 permits such movement of lead-in lever 48. A portion 110 of chassis 35 (FIGS. 2,5A and 5B) which defines the back edge of cutout 35a acts as an abutment engageable by pin 109 on lead-in lever 48 for limiting the return swinging movement of lever 48 in the counterclockwise direction as viewed on FIG. 5A.

In order to ensure that lead-in lever 48 will be smoothly swingable about pivot pin 79, a flanged guide roller 111 is rotatably mounted on the upper surfave of the central portion of lever 48 and engages in an elongated arcuate slot 112 formed in chassis 35 so as to be concentric with pivot pin 79. Smooth swinging movement of main lever 47 is similarly ensured by a pin 113 depending from the middle portion of arm 82 of lever 47 and slidably engaging in arcuate slot 112 with a washer on pin 113 being interposed between lever 47 and chassis 35.

Main lever 47 is further shown to include an arm 114 directed rearwardly from pivot pin 79 substantially at right angles to arms 80 and 82. In order to detect a play operation of record player 10, a pin 115 depends from arm 114 of main lever 47 through an arcuate slot 116 formed in chassis 35, as shown in broken lines on FIGS. 5A and 5B, and such pin 115 is adapted to actuate a micro-switch $SW_2$ suitably mounted below chassis 35. More particularly, switch $SW_2$ is disposed so as to be actuated by pin 115 and thereby detect the play operation of record player 10 when main lever 47 is positioned as shown on FIG. 7C, that is, when main lever 47 is disposed by cam 57 in the position corresponding to the play position of control gear 53 in which the toothless gap 56b of the latter faces toward pinion 52.

As shown particularly on FIGS. 5A and 5B, the record size selecting mechanism 49 may comprise a generally sectorshaped size selecting cam member 117 which is disposed below chassis 35, and which is pivoted on a pin 117a depending from the chassis. The record size selecting knob 22 is connected by a suitable mechanism including a link 121 with cam member 117 so that, in response to turning of knob 22, a selected edge portion of member 117 can be disposed for engagement by an abutment member 127 which extends upwardly from a forwardly directed extension 48b at the middle portion of lead-in lever 48.

As shown particularly on FIG. 9, the brake mechanism 50 desirably includes a generally T-shaped brake operating lever 136 pivotally mounted under chassis 35 on a pivot pin 137 depending from the latter, and a brake operating lever 136 also disposed below chassis 35 and being pivoted, at one end, on pin 137. Lever 136 is shown to have angularly related arms 136a, 136b and 136c extending from its pivoting axis, and a tension spring 139 is connected between a pin 140 on the free end of arm 136c and an anchor pin 141 depending from chassis 35 for urging lever 136 in the counter-clockwise direction, as viewed on FIGS. 5A and 5B.

In order to control the position of brake operating lever 136 in dependence on the position of main lever 47, a pin 142 depends from the free end portion of rearwardly directed arm 114 to main lever 47 and extends downwardly through an arcuate slot 143 formed in chassis 35 so as to be concentric with the axis of pivot pin 79, as indicated in broken lines on FIGS. 5A and 5B.

At its lower end, pin 142 carries a rotatable roller 144 which is engaged by either an oblique end edge 145 or a contiguous longitudinal side edge 146 of lever arm 136a under the urging of spring 139 on brake operating lever 136. Arm 136a of lever 136 is dimensioned and pivot pin 137 for such lever is located so that, when main lever 47 is in its stop position (FIG. 5A), roller 144 engages oblique end edge 145 of lever arm 136a and so that, as main lever 47 moves from its stop position (FIG. 5A) to its play position (FIG. 5B), that is, during the lead-in movement of main lever 47, roller 144 moves off oblique end edge 145 and then along contiguous side edge 146 for initially turning lever 136 in the clockwise direction against the force of spring 139 and then permitting spring 139 to restore lever 136 to its original position.

Referring to FIG. 9, it will be seen that brake lever 138 is urged to follow such clockwise movement of brake operating lever 136 by a tension spring 147 connected between lever 138 and arm 136b. A limit screw 148 extends threadably through a tapped hole in a tab 149 depending from a side edge of lever 138, and such limit screw 148 is engageable, at its end, against an abutment or lug 150 provided at the free end of lever arm 136b for adjustably limiting the angular displacement of brake lever 138 relative to operating lever 136 under the urging of spring 147. Finally, a brake pad or shoe 151 is mounted at the free end of brake lever 138 for frictional braking engagement with the circumferential surface of boss 88 on tone arm support shaft 29, for example, as shown on FIGS. 7B,7D and 7E when brake operating lever 136 is turned in the clockwise direction against the force of spring 139. It will be apparent that the adjustment of limit screw 148 determines the initial angular position of brake lever 138 relative to operating lever 136, is thus effective to regulate the braking force applied by brake shoe or pad 151 to collar or boss 88 when brake operating lever 136 is angularly displaced in the clockwise direction by roller 144 on main lever 47 for applying the brake mechanism, that is, engaging brake pad 151 with boss 88.

It is further to be noted that, when control gear 53 is in its stop position (FIG. 7A), the force of spring 139 acting on lever 136 causes oblique end surface 145 of lever arm 136a to apply a force $F_1$ to roller 144 which is directed to urge main lever 47 in the counterclockwise direction about pivot 79. As a result of the urging of lever 47 in the counterclockwise direction cam follower roller 81 is pressed into the inverted cusp or depression 57d defined in the inner wall surface of cam groove 57, whereby to prevent inadvertent movement of control gear 53 from its stop position in which toothless gap 56a faces pinion 52. On the other hand, when control gear 53 is in its play position (FIG. 7C), the force of spring 139 acting on lever 136 causes side surface 146 of lever arm 136a to exert a force $F_2$ on engaged roller 144, which force $F_2$ is directed to urge main lever 47 in the clockwise direction. Such clockwise urging of main lever 47 presses cam follower roller 81 into the inverted cusp or depression 57c formed in the outer wall surface of cam groove 57 and thus prevents inadvertent angular displacement of control gear 53 from its play position in which the toothless gap 56b faces pinion 52. Accordingly, the engagement of lever 136 with roller 144 on main lever 47 serves the dual functions of controlling the operation of brake mechanism 50 in response to the lead-in and return movements of main lever 47, and of ensuring that control gear 53 will be immovably positioned at its stop position or at its play position until such time as the lead-in movement or return movement of control gear 53 is positively initiated by engagement of the clutch 60 and 61, respectively.

The above described record player 10 according to this invention operates as follows:

STOP CONDITION

In the stop condition of record player 10, power ON-OFF switch actuator or knob 20 is in its OFF position whereby to deenergize motor 36. Further, in the stop condition of record player 10, control gear assembly 45, actuating slide 46, main lever 47, lead-in lever 48, brake mechanism 50 and tone arm drive mechanism 51 are all in the relative positions shown on FIGS. 5A and 7A. Since vertically movable shaft 38 of arm lifter 37 rests on the horizontal surface of arm 82 of main lever 47, as shown in full lines on FIG. 4, shaft 38 is located at its raised position with the result that arm lifter 37 contacts, or is adjacent to the lower surface of tone arm 27 which is resting on arm rest 34. Further, as previously described, by reason of the force $F_1$ applied by brake operating lever 136 to roller 144 on main lever 47, cam follower roller 81 is securely urged into the inverted cusp or depression 57d in the inner wall surface of cam groove 57 for positively holding control gear 53 in its stop position with toothless gap 56a facing toward pinion 52. Thus, control gear 53 cannot be inadvertently displaced from its stop position by impacts or shocks applied to the record player, and thus control gear 53 will not be accidentally rotated by pinion 52 when motor 36 is initially energized.

FULLY AUTOMATIC OPERATION

With the record player in its stop condition, the manipulation of power ON-OFF switch actuator 20 to its ON position merely supplies power to the circuits (not shown) of the record player. However, motor 36 remains denergized, and hence turntable 14 remains at rest, until start-stop switch actuator 18 is manipulated or touched to initiate an automatic operation of the record player.

LEAD-IN OPERATION

Upon such manipulation of switch actuator 18, motor 36 is energized for rotating driving shaft 15 and turntable 14 at a predetermined speed in the direction of the arrow c on FIG. 2. The manipulation or touching of switch actuator 18 further causes the momentary energizing of electromagnet 77 for attracting the vertical portion 46c of actuating slide 46 and thereby displacing the latter in the direction of actuating slide 46, projection 46e at the end of horizontal slide portion 46a acts against projection 60e of clutch mechanism 60 for displacing the latter to its engaged position shown in full lines on FIG. 12. In such engaged position of clutch mechanism 60, the free end of its arm 60a is urged against the rim 52b at the top of pinion 52 so as to be interposed in the path of movement of abutment 52a with pinion 52. Accordingly, as abutment or nose 52a rotates in the direction of the arrow c on FIG. 12 with pinion 52 on driving shaft 15 such abutment 52a comes into engagement with the end of arm 60a and pushes the latter longitudinally in the direction of the arrow e (FIG. 12). The resulting incremental rotation of control gear 53 in the direction of the arrow f is sufficient to displace toothless gap 56a away from pinion 52 and to cause meshing engagement of the latter with teeth 55a.

Upon the engagement of teeth 55a with pinion 52, drive gear 53 is rotated in the direction of arrow f through an angular displacement of 180°. During such angular displacement of lead-in movement of control gear 53, pin 59a depending therefrom moves against one of the sloping or slanting flanks of V-shaped projection 46e on actuating slide 46 to exert a cam action on the latter for returning the slide 46 to its inoperative position shown in broken lines on FIGS. 12 and 15. It will be noted that, by the time pin 59a is thus effective to return slide 46 to its inoperative position, electromagnet 77 is deenergized. During the lead-in movement of control gear 53 through the angular extent of 180°, depression or inverted cusp 57d moves away from cam follower roller 81 and the latter is guided by cam groove portion 57a (FIG. 7B) until, at the completion of the lead-in movement of gear 53, roller 81 engages inverted cusp or depression 57c (FIG. 7C). Further, at the start of the lead-in movement of control gear 53, switch $SW_1$ is actuated by the radially raised cam portion 58a for electrically detecting the lead-in operation of the record player.

During the guiding of cam follower roller 81 by cam groove portion 57a in the course of the lead-in movement of control gear 53, roller 81 is displaced in the direction of the arrow g away from shaft 54 (FIG. 7B) so as to effect angular displacement or lead-in movement of main lever 47 in the direction of the arrow h (FIG. 7B) from the position shown on FIG. 7A to the position shown on FIG. 7C.

It is to be noted that the lead-in movement of tone arm 27 to the set-down position predetermined by the setting of record size selecting mechanism 49 is completed prior to the arrival of main lever 47 at the extreme or play position shown on FIG. 7C. More particularly, as main lever 47 is turned in the direction of the arrow h from the position thereof shown on FIG. 7A, the flank 101a of nose 101 on hooked lead-in drive member 94 on lever 47 is moved against coupling pin 109 on lead-in lever 48 (FIG. 7B) so that lead-in lever 48 is thereafter urged to move with main lever 47 in the direction of arrow h. As lead-in lever 48 is moved with main lever 47 in the direction of the arrow h on FIG. 7B, forwardly directed extension 48a of the lead-in lever engages pin 92 on upper sector-shaped member 86 for turning the latter in the clockwise direction about the axis of shaft 29. Such turning of upper sector-shaped member 86 is transmitted to lower sector-shaped member 87 which is fixed relative to shaft 29 through the engagement of tab 86b on member 86 with limit screw 91 carried by member 87. Thus, so long as lead-in lever 48 is turned with main lever 47 in the direction of arrow h on FIG. 7B, tone arm support shaft 29 is turned in the direction to effect lead-in movement of tone arm 27, as indicated by the arrow i on FIG. 2. During such lead-in movement of tone arm 27, the latter slides on the elevated arm lifter 37 and thus is in its raised position shown in full lines on FIG. 4 and the needle or stylus 33 is spaced from the record R as it moves inwardly over the latter.

Upon completion of a predetermined lead-in movement of tone arm 27 established by the previous setting of record size selecting knob 22, abutment member 127 on lead-in lever 48 engages a selected edge portion of record size selecting cam member 117 then disposed at the operative position, for example, the stopper edge portion 126b as shown on FIG. 7B, so as to prevent further movement of lead-in lever 48 with main lever 47 in the direction of arrow h. Thereafter, during further movement of main lever 47 in the direction of arrow h, the angled flank 101a of nose 101 on drive member 94 and then the angled flank 101b cams across coupling pin 109 while drive member 94 is yieldably urged against pin 109 by the force of spring 97 until finally nose 101 is released from coupling pin 109 and the lead-in movement of main lever 47 can continue independently of lead-in lever 48. As main lever 47 continues to turn in the direction of arrow h on FIG. 7B, for example, to the play position shown on FIG. 7C, downwardly inclined ramp 84 of main lever 47 moves under shaft 38 so as to permit gravitationally induced downward movement of shaft 38 and of arm lifter 37 therewith so that tone arm 27 is lowered to the position shown in broken lines on FIG. 4 and needle or stylus 33 engages record R at the previously predetermined set-down position. Upon such engagement of the needle or stylus 33 with record R, the lead-in operation of record player 10 is completed and a play operation thereof is commenced.

As main lever 47 attains its play position at the completion of the lead-in movement thereof, pin 115 depending from main lever 47 actuates switch $SW_2$ so that the latter electrically detects the commencement of a play operation. Furthermore, as main lever 47 near its play position, abutment 105 of return drive member 95 is engaged with projection 108 of the chassis for causing angular displacement of return drive member 95 from its retracted position and permitting toggle spring 106 to complete the movement of drive member 95 to its extended position, as shown on FIG. 5B. At the completion of the lead-in movement or turning of control gear 53 through 180° from the stop position of FIGS. 5A and 7A to the play position of FIGS. 5B and 7C, the actuator of switch $SW_1$ moves from the raised portion 58a to the depressed portion 58b of radial cam 58 so as to electrically detect the completion of the lead-in operation. By reason of the direction of the force $F_2$ (FIG. 7C) applied to main lever 47 by brake operating lever 136 under the influence of spring 139, main lever 47 is urged in the direction for pressing cam follower roller 81 thereon into the inverted cusp or depression 57c in the outer wall surface of cam groove 57 for positively holding control gear 53 in its play position with toothless gap 56b facing toward pinion 52. Thus, upon completion of the lead-in operation, control gear 53 cannot be inadvertently displaced from its play position by impacts or shocks applied to the record player and, therefore, will not be accidentally rotated by pinion 52 during the following play operation.

It is to be noted that during the lead-in operation of record player 10, a suitable braking force is applied by brake mechanism 50 to the collar or boss 88 on tone arm support shaft 29 so that the lead-in movement of tone arm 27 to its predetermined set-down position is smoothly effected. More particularly, during the initial portion of the lead-in movement of main lever 47 in the direction of the arrow h on FIG. 7B, roller 144 moves off oblique end edge 145 of brake operating lever 136 and then along the contiguous side edge 146 for initially turning lever 136 in the clockwise direction against the force of spring 139. Brake lever 138 is urged by spring 147 to follow such clockwise movement and thereby apply brake pad 151 against boss 88 for exerting the desired braking force. However, during the final lead-in movement of main lever 47 to its play position (FIGS. 5B and 7C), roller 144 moves further along side edge 146 of brake operating lever 136 to permit spring 139 to return the latter in the counterclockwise direction substantially to its original position. By reason of the engagement of limit screw 148 with lug 150, brake lever 138 is made to follow the counter-clockwise turning of brake operating lever 136 for separating brake pad 151 from collar or boss 88 so that the braking force is not applied to boss 88 and tone arm support shaft 29 at the completion of the lead-in operation and during the subsequent play operation of record player 10.

Furthermore, in the described record player 10, the tone arm drive mechanism 51 ensures that none of the parts of automatic control mechanism 44 will be damaged in the event that an unexpected force is applied to tone arm 27 in the direction of the arrow $i$ or in the direction of the arrow $i'$ on FIG. 2, for example, by the hand of the user, during the lead-in operation.

PLAY OPERATION

At the completion of the lead-in movement of control gear 53, that is, at the start of the play operation of record player 10, the positions of clutch mechanisms 60 and 61 are the reverse of the positions thereof in the stop condition of the record player, that is, downwardly directed projection 66b of the underlying cam member 66 of clutch mechanism 61 is adjacent the projection 46e on actuating slide 46 (FIG. 13). Further, at the commencement of the play operation, pin 93 is spaced from end 46f of actuating slide 46, as shown in full lines on FIG. 13. During the play operation, the engagement of needle 33 in the spiral groove of record R causes the progressive inward swinging of the tone arm in the direction of the arrow $i$ on FIG. 13.

RETURN OPERATION

When needle 33 has reached the inner end of the spiral grooove in record R, for example, when the tone arm assembly 16 has reached the position indicated in broken lines at 16' on FIG. 13, pin 93 on upper sector-shaped member 86 moves to the position indicated in broken lines at 93' and acts against the adjacent end 46f of actuating slide 46 for displacing the latter in the direction of the arrow $d$. As a result of such displacement of actuating slide 46, projection 46e at the end thereof acts against projection 66b of underlying cam member 66 for turning the latter in the counterclockwise direction about pivot pin 67. Due to the frictional engagement of engaging member 65 with cam member 66, engaging member 65 is turned with the underlying cam member 66, for establishing the engaged condition of clutch mechanism 61, for example, as indicated in broken lines at 61' on FIG. 13. In such engaged condition of clutch mechanism 61, the free end of arm 65a of engaging member 65 projects above toothless gap 56b of control gear 53 against the rim 52b at the top of pinion 52 so as to be interposed in the path of movement of abutment 52a. Accordingly, as abutment or nose 52a rotates with pinion 52 in the direction of arrow $c$ on FIG. 13, abutment 52a comes into engagement with the end of arm 65a and pushes the latter longitudinally to effect an incremental rotation of control gear 53 in the direction of the arrow $f$. Such incremental rotation of gear 53 is sufficient to displace toothless gap 56b away from pinion 52 and to cause meshing engagement of the latter with teeth 55b. Upon the engagement of teeth 55b with pinion 52, control gear 53 is rotated in the direction of arrow $f$ through an angular displacement of 180° for effecting a return operation of control mechanism 44. During such half-revolution or return movement of control gear 53, pin 59b depending therefrom moves against one of the sloping or slanting flanks of V-shaped projection 46e on actuating slide 46 for returning the slide to its inoperative position indicated in full lines on FIG. 13.

Figure 8B:
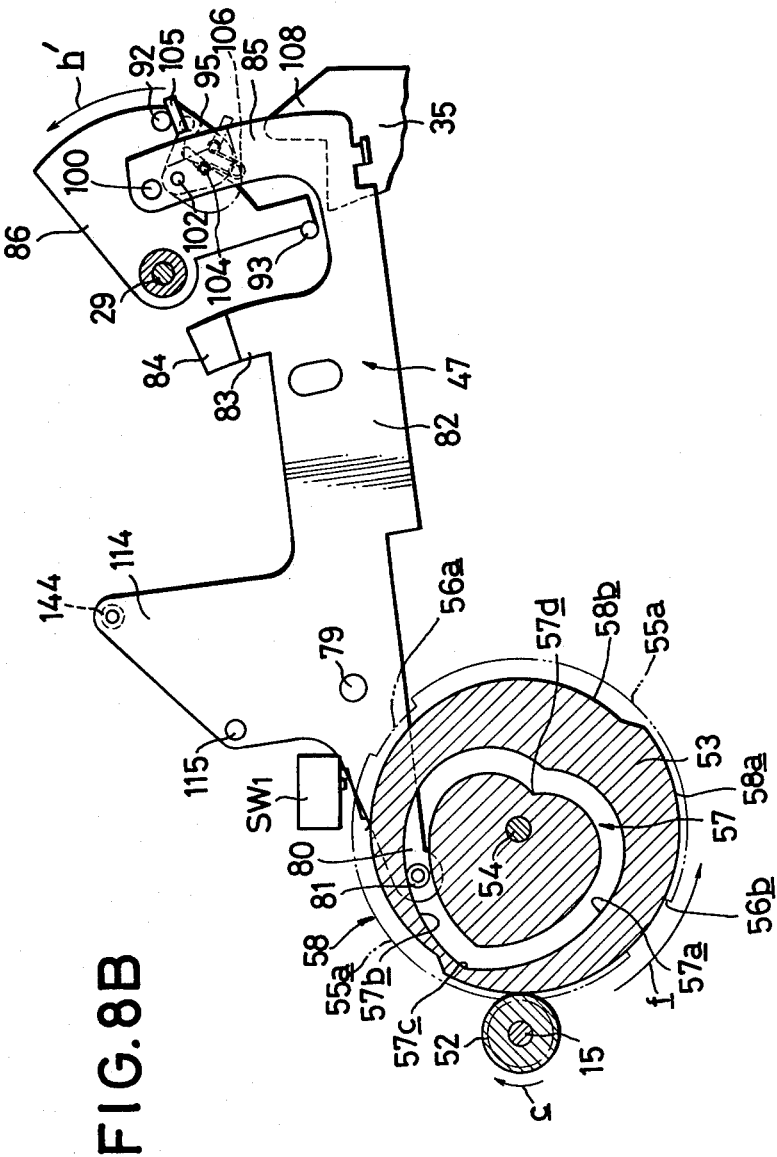

During the return movement of control gear 53, depression or inverted cusp 57c moves away from cam follower roller 81 and the latter is guided by cam groove portion 57b (FIG. 7D) until, at the completion of the return movement of gear 53, roller 51 again engages inverted cusp or depression 57d (FIG. 8C). During the guiding of cam follower roller 81 by cam groove portion 57b in the course of the return movement of control hear 53, roller 81 is displaced in the direction toward shaft 54 so as to effect angular displacement or return movement of main lever 47 in the direction of the arrow $h'$ (FIG. 7D) from the position shown on FIG. 7C to the position shown on FIG. 8C. At the commencement of such return movement of main lever 47 in the direction of the arrow $h'$, pin 115 on main lever 47 is separated from the actuator of play detecting switch $SW_2$ so as to electrically indicate that the play operation has been terminated. Further, at the commencement of the return movement of main lever 47, inclined ramp 84 on main lever 47 moves out from under arm lifter shaft 38 so that the latter is raised and thereafter supported on the horizontal portion of main lever 47, with the result that arm lifter 37 is raised for lifting tone arm 27 and separating needle 33 from the record R during the return operation. As the return movement of main lever 47 is continued, abutment 105 of return drive member 95 in its extended position engages pin 92 on upper sector-shaped member 86 so as to push that pin 92 in the direction of the arrow $h'$ on FIG. 8B. Thus, sector-shaped member 86 is turned in the counter-clockwise direction about tone arm support shaft 29 and the lower sector-shaped member 87 is made to follow such turning movement of member 86 through the connecting spring 90, with the result that tone arm 27 is made to swing outwardly in the direction of the arrow $i'$ on FIG. 2 while being held in its raised position on arm lifter 37.

During the return movement of main lever 47 in the direction of the arrow $h'$ on FIG. 7D, the angled flank 101b on nose 101 of drive member 94 acts against coupling pin 109 on lead-in lever 48 for similarly turning the lead-in lever in the direction of the arrow $h'$ about pivot pin 79.

The several parts of control mechanism 44 are dimensioned and arranged so that the return swinging movement of tone arm 27 to its rest position on arm rest 34 is completed prior to the completion of the return movement of control gear 53, for example, at a time when control gear 53 is in the position shown on FIG. 7E. When control gear 53 attains the position shown on FIG. 7E, pin 109 on lead-in lever 48 engages abutment 110 of the chassis so as to prevent further return swinging movement of lead-in lever 48. Therefore, during the final return movement of control gear 53 to the stop position indicated on FIG. 8C, nose 101 of drive member 94 cams over coupling pin 109 so as to be again engaged in back of the latter, as indicated in broken lines on FIG. 7E. Further, during the final return movement of control gear 53, for example, from the positon shown on FIG. 7E to the stop position shown on FIG. 8C, that is, during the final return movement of main lever 47 from the position shown in broken lines at 47' on FIG. 8C to the position shown in full lines thereon, additional turning of upper sector-shaped member 86 is blocked by the engagement of tone arm 27 with arm rest 34 and, therefore, movement of pin 92 by abutment 105 of return drive member 95 is arrested. Accordingly, during movement of the main lever from the position indicated in broken lines at 47' to the position shown in full lines on FIG. 8C, pin 92 reacts against abutment 105 of return drive member 95 for displacing the latter from its extended position indicated in broken lines at 95' to its retracted position where it is thereafter held by toggle spring 106.

During the final return movement of control gear 53 back to its stop position shown on FIG. 5A, clutch mechanism 60, which has been in its engaged position since initiation of the previously described lead-in operation, is returned to its disengaged position. Such return of clutch mechanism 60 from its engaged position to its disengaged position is effected by the movement of its projecting cam portion 60d across the periphery of drive gear 52. Accordingly, when control gear 53 returns to its original or stop position in which toothless gap 56a faces towards drive gear 52, nose or abutment 52a can rotate with drive gear or pinion 52 without engaging arm 60a of clutch mechanism 60. Further, upon the return movement of control gear 53 to its stop position (FIG. 7A) inverted cusp or depression 57b of cam 57 is again located at cam follower roller 81 and the latter is pressed into such inverted cusp or depression by the force $F_1$ applied to main lever 47 from brake control lever 136 so that control gear 53 is again held securely against inadvertent displacement from its stop position.

It is also to be noted that, during the above described return operation, brake mechanism 50 applies a braking force to collar or boss 88 on tone arm support shaft 29 for braking the return movement of tone arm 27 to its rest position in a manner similar to the above description of the application of the braking force during the lead-in operation. More particularly, during the return movement of main lever 47 in the direction of the arrow $h'$ on FIGS. 7D and 7E, roller 144 on main lever 47 moves toward the left along side edge 146 of brake control lever 136 so as to turn the brake control lever in the clockwise direction and thereby press brake shoe or pad 151 on brake lever 138 against collar or boss 88 on tone arm support shaft 29. However, during the final portion of the return movement of main lever 47 to its stop position, roller 144 moves onto oblique end edge 145 of brake control lever 136 so as to permit spring 139 to turn lever 136 in the counterclockwise direction and thereby separate brake shoe or pad 151 from boss 88, as shown on FIG. 5A.

It will be seen that the control mechanism 44 is constructed and arranged to prevent any damage to its several parts in the event that, during the described return operation thereof, an unexpected force is applied to tone arm 27 for example, by the hand of the user, either in the direction of the arrow $i$ or in the direction of the arrow $i'$ on FIG. 2.

REJECT OPERATION

At any time during a play operation of control mechanism 44, the start-stop switch actuator 18 may be manipulated or touched for momentarily energizing electromagnet 77 and thereby initiating a reject operation. The momentary energizing of electromagnet 77 causes displacement of actuating slide 46 in the direction of the arrow $d$ on FIG. 13 so that the end projection 46e of the actuating slide is then effective to displace clutch mechanism 61 to its engaged position as has been described above in connection with the initiation of a return operation. Following such movement of clutch mechanism 61 to its engaged position, the reject operation proceeds in the same manner as the return operation, so that tone arm 27 is returned to its rest position on arm rest 34 and the several parts of control mechanism 44 are returned to the positions thereof shown on FIG. 5A.

MANUAL OPERATION

When it is desired to effect manual operation of record player 10, knob 22 is set to a position for manual operation so as to dispose a respective stopper edge portion of cam member 117 at the position for engagement by abuttment 127. With control mechanism 44 in its stop condition, arm lifter 37 is held in its raised position by the engagement of its support shaft 38 with the horizontal portion of main lever 47, and tone arm 27 is manually displaced inwardly in the direction of the arrow $i$ on FIG. 2 to the desired set-down position. During such manual displacement of tone arm 27, the latter slides across raised arm lifter 37 so that needle 33 is elevated in respect to record R on turntable 14. Since return drive member 95 is in its retracted position when control mechanism 44 is in its stop condition (FIG. 5A), the abutment 105 of drive member 95 is spaced inwardly in respect to the arcuate path of movement of pin 92 about tone arm support shaft 29 so as to avoid interference with the described manually effected inward swinging of the tone arm to the desired set-down position.

After having manually located tone arm 27 at the desired set-down position, start-stop switch actuator 18 is manipulated or touched so that, as in the previously described lead-in operation, electromagnet 77 is momentarily energized to displace actuating slide 46 in the direction of the arrow $d$ on FIG. 18 for engaging clutch mechanism 60. Thus, turning of control gear 53 through a half revolution from the position of FIG. 5A to the position of FIG. 5B is initiated for effecting corresponding swinging of main lever 47. However, when manual operation has been selected, the engagement of abutment 127 on lead-in lever 48 with the respective stopper edge portion on size-selecting cam member 117 prevents substantial movement of lead-in lever 48 away from its stop position on FIG. 5A. Therefore, as main lever 47 is turned in the direction of the arrow $h$ on FIG. 7B, lead-in lever 48 remains in its stop position and lead-in drive member 94 has its nose 101 disengaged from coupling pin 109 on the lead-in lever. When main lever 47 arrives at its play position (FIG. 7C), downwardly inclined ramp 84 moves under shaft 38 so as to permit gravitationally induced downward movement of shaft 38 and of arm lifter 37 thereon so that tone arm 27 is lowered and the needle or stylus 33 engages record R at the previously manually selected set-down position. Upon such engagement of needle of stylus 33 with record R, the play operation of record player 10 commences.

If desired, during manual operation, the vertical movements of arm lifter 37, and hence the lowering of tone arm 27 for engaging needle or stylus 33 with record R at a previously manually selected set-down position may be controlled by the manually actuable cueing control handle 40. In other words, handle 40 may be initially disposed to maintain arm lifter 37 in its raised position even when main lever 47 attains its play position (FIG. 5B) with inclined ramp 84 under shaft 38.

Thereafter, when it is desired to initiate the play operation, handle 40 is manipulated to lower shaft 38 and arm lifter 37, and thereby cause engagement of the needle or stylus with the record.

During the above described manual operation of record player 10, the return operation of control mechanism 44 and/or the reject operation thereof may occur in the same manner as has been previously described with respect to the fully automatic operation of the record player.

It will be seen that, in the record player control mechanism 44 according to this invention, the point of engagement of roller 144 on main lever 47 with lever 138 is at one side of pivot pin 79 of main lever 47 when main lever 47 and control gear 53 are in their stop positions (FIG. 7A) and at the opposite side of pivot pin 79 when main lever 47 and control gear 53 are in their play positions (FIG. 7C). Thus, main lever 47, when in its stop position, is urged in the counter-clockwise direction by the force $F_1$ resulting from spring 139 for pressing cam follower roller 81 into depression 57d in the inner side wall surface of cam groove 57 and thereby holds control gear 53 against inadvertent turning from its stop position. On the other hand, when main lever 47 is in its play position, lever 47 is urged in the clockwise direction by the force $F_2$ resulting from the same spring 139 for pressing cam follower roller 81 into depression 57c in the outer side wall surface of cam groove 57 and thereby holding control gear 53 against inadvertent turning from its play position. Moreover, it will be seen that the depressions 57c and 57d are defined by the inverted cusps formed in the outer and inner side wall surfaces of cam groove 57 by reason of the heart-shaped configuration of the latter.

By reason of the foregoing features in the control mechanism 44 according to this invention, a very simple and inexpensive arrangement is provided for holding control gear 53 against inadvertent turning from both its stop position and its play position. Furthermore, by forming the depressions 57c and 57d as inverted cusps in a heart-shaped cam groove 57, improved precision is achieved in the reliable disposition of control gear 53 at its stop position and play position, and the cam follower roller 81 moves smoothly into such inverted cusp-like depressions 57c and 57d for minimizing the shock and noise resulting from the positioning of control gear 53 at its stop and play positions.

It will further be seen that, in the course of the lead-in movement and the return movement of main lever 47, as on FIGS. 7B and 7D, respectively, the force of spring 139 applied from lever 136 to roller 144 on main lever 47 is in a direction that moves near to or through the pivot pin 79 of main lever 47 so that the turning moment applied to lever 47 as a result of the force of spring 139 is correspondingly reduced, whereby to similarly reduce the frictional resistance to movement of cam follower roller 81 along cam groove 57. Thus, in the arrangement according to this invention, control gear 53 is reliably held against inadvertent turning from its stop position or play position, as previously described, but such arrangement imposes little resistance to the turning of control gear 53 during the lead-in operation and the return operation of control mechanism 44.

It will also be apparent that, in the record player control mechanism according to this invention, the brake mechanism 50 is effective to frictionally brake the swinging movement of tone arm 27 during the lead-in of the latter from its rest position to a predetermined set-down position as well as during the return swinging movement of the tone arm to its rest position. Thus, although tone arm 27 can be manually swung in the direction of the arrow *i* on FIG. 2 during the lead-in operation in which case pin 92 moves away from extension 48a of lead-in lever 48, and similarly tone arm 27 can be manually swung in the direction of the arrow *i'* on FIG. 2 during a return operation, in which case pin 92 moves away from return drive member 95, all as previously described, the brake mechanism 50 ensures that such freedom of movement of the tone arm, which is provided for protecting control mechanism 44 against damage due to manually applied forces, will not disturb the accuracy with which stylus 33 is set down at a predetermined position on the record, and further will not cause rebounding of the tone arm from its rest position on arm rest 34 at the completion of a return operation.

Furthermore, since the engagement and disengagement of shoe 151 of brake mechanism 50 with collar 88 on tone arm support shaft 29 is controlled by rocking of lever 136 in response to turning of main lever 47 during the lead-in and return operations, the cooperative engagement of the edge of spring-biased lever 136 with roller 144 on main lever 47 is used both for controlling brake mechanism 50 and for holding control gear 53 against inadvertent turning from its stop and play positions, so as to further simplify the structure of record player control mechanism 44 according to this invention.

Although an illustrative embodiment of the invention has been described in detail herein with reference to the accompanying drawings, it is to be noted that the invention is not limited to that precise embodiment and that various changes and modifications may be effected therein by one skilled in the art without departing from the scope or spirit of the invention as defined in the appended claims.

What is claimed is:

1. In a phonograph record player having a rotatable turntable for supporting a phonograph record during the playing thereof, drive means for rotating said turntable, and a tone arm assembly including a tone arm carrying a pickup with a stylus to track the groove of a phonograph record on said turntable during a play operation and being mounted for lateral swinging movement across said turntable and for raising and lowering of the tone arm relative to said turntable: a control mechanism for effecting lead-in movement of said tone arm from an elevated rest position outside the perimeter of said turntable to a selected set-down position of said stylus on a record supported by said turntable so as to commence a play operation, and for effecting a return movement of said tone arm to said rest position upon the termination of said play operation, said control mechanism comprising a drive gear rotatable by said drive means;

a rotatable control gear having first and second sets of peripheral teeth engageable by said drive gear for respectively effecting lead-in and return movements of said control gear and being separated from each other by first and second toothless gaps which, when facing toward said drive gear in stop and play positions, respectively, of said control gear, permit the latter to remain at rest while said drive gear continues to rotate, said control gear further having a continuous cam groove therein which includes a lead-in cam groove portion having connections, at its opposite ends, to adjacent ends of a return cam groove portion, and first and second depressions in opposite side walls, respectively, of said cam groove at said connections, respectively, of the lead-in and return cam groove portions;

pivotally mounted lever means having a cam follower engaging said cam groove for effecting said lead-in and return movements of said tone arm by engagement of said cam follower with said lead-in and return cam groove portions during said lead-in and return movements, respectively, of said control gear wherein said cam follower completely traverses said lead-in and return cam groove portions during said lead-in and return movements;

propelling means operative for initiating movement of said control gear from each of said stop and play positions thereof; and control gear holding means acting on said lever means to urge said cam follower in one direction into said first depression with said control gear in said stop position and in the opposite direction into said second depression with said control gear in said play position, whereby to hold said control gear against inadvertent movement from each of said stop and play positions in the absence of operation of said propelling means.

2. A phonograph record player according to claim 1; in which said cam groove is heart-shaped so as to define said lead-in and return cam groove portions at the opposite sides of its plane of symmetry and further to provide inverted cusps in the inner and outer side walls of said cam groove constituting said first and second depressions, respectively.

3. A phonograph record player according to claim 1; in which said lever means includes a main lever carrying said cam follower and being turnable about a pivoting axis between angularly spaced apart stop and play positions of said main lever corresponding to the engagement of said cam follower with said first and second depressions, respectively; and in which said control gear holding means includes an additional pivoted lever, a spring urging said additional lever to turn in one direction, and cooperating means on said main lever and additional lever which are engageable with each other for transmitting the force of said spring to said main lever at first and second locations in said stop and play positions, respectively, of the main lever and thereby urging said main lever in opposite directions about said pivoting axis in said stop and play positions, respectively, of said main lever.

4. A phonograph record player according to claim 3; in which said cooperating means includes an edge on said additional lever and a roller on said main lever movable along said edge between said first and second locations.

5. A phonograph record player according to claim 4; in which said edge of the additional lever includes a side edge portion and an end edge portion extending obliquely from said side edge portion, said roller engages said end edge portion for transmitting the force of said spring at said first location with said main lever in its stop position, and said roller engages said side edge portion for transmitting the force of said spring at said second location with said main lever in its play position.

6. A phonograph record player according to claim 3; in which said cooperating means cause rocking of said additional lever in response to the turning of said main lever between said stop and play positions of the latter for effecting said lead-in and return movements of the tone arm; and further comprising braking means made operative by said rocking of the additional lever for braking said lead-in and return movements of the tone arm.

7. A phonograph record player according to claim 6; in which said braking means includes a brake lever carrying a brake shoe and being pivoted in respect to said additional lever, limiting means for limiting the pivoting in one direction of said brake lever relative to said additional lever, a second spring connected between said additional lever and said brake lever for urging the latter to pivot in said one direction, and a braking surface coupled with said tone arm in respect to said lateral swinging of the tone arm and being engaged by said brake shoe for said braking of the lead-in and return movements of said tone arm.

8. A phonograph record player according to claim 7; in which said cooperating means includes an edge on said additional lever and a roller on said main lever movable along said edge between said first and second locations, said edge being contoured so that the position of said additional lever is substantially the same when said edge is engaged by said roller at said first and second locations for spacing said brake shoe from said braking surface, and so that, in movement of said roller between said first and second locations, said additional lever is rocked in said one direction of pivoting of said brake lever to cause said second spring to urge said brake shoe against said braking surface.

9. A phonograph record player according to claim 1; in which said propelling means includes lead-in clutch means and return clutch means mounted on said control gear adjacent said first and second toothless gaps and each having an inoperative disengaged condition and an engaged condition in which the respective clutch means is operative for initiating said movement of the control gear, and a single actuating member operative, with said control gear in said stop and play positions, to changeover said lead-in clutch means and said return clutch means, respectively, from said disengaged condition to said engaged condition of the respective clutch means.

* * * * *